(12) United States Patent
Kawamura

(10) Patent No.: US 11,267,121 B2
(45) Date of Patent: Mar. 8, 2022

(54) CONVERSATION OUTPUT SYSTEM, CONVERSATION OUTPUT METHOD, AND NON-TRANSITORY RECORDING MEDIUM

(71) Applicant: CASIO COMPUTER CO., LTD., Tokyo (JP)

(72) Inventor: Yoshihiro Kawamura, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 262 days.

(21) Appl. No.: 16/273,729

(22) Filed: Feb. 12, 2019

(65) Prior Publication Data
US 2019/0248001 A1     Aug. 15, 2019

(30) Foreign Application Priority Data

Feb. 13, 2018  (JP) .............................. JP2018-022982
Nov. 22, 2018  (JP) .............................. JP2018-218848

(51) Int. Cl.
*B25J 9/16* (2006.01)
*G10L 15/28* (2013.01)
(Continued)

(52) U.S. Cl.
CPC ............. *B25J 9/161* (2013.01); *B25J 9/0003* (2013.01); *B25J 9/162* (2013.01); *B25J 9/1661* (2013.01);
(Continued)

(58) Field of Classification Search
CPC . B25J 9/161; B25J 9/0003; B25J 9/162; B25J 9/1661; B25J 9/1679; B25J 9/1697; B25J 11/001; B25J 11/003; G10L 15/28
See application file for complete search history.

(56) References Cited

U.S. PATENT DOCUMENTS 5,963,712 A * 10/1999 Fujita ..................... B25J 9/1615
                                                          700/264
2002/0081937 A1* 6/2002 Yamada ................... A63H 3/48
                                                          446/175
(Continued)

FOREIGN PATENT DOCUMENTS

CN        106292730 A       1/2017
JP        2003-205483 A     7/2003

OTHER PUBLICATIONS

CNIPA; Application No. 201910112506.4; Office Action dated Mar. 16, 2021.

*Primary Examiner* — Khoi H Tran
*Assistant Examiner* — Nhi Q Bui
(74) *Attorney, Agent, or Firm* — Fitch, Even, Tabin & Flannery LLP

(57) ABSTRACT

First information is acquired that is information of at least one of information about a user of a robot or situation information that is information about a situation around the robot. Conversation data is generated on the basis of the first information that is acquired. The conversation data creates an impression on the user that the robot and a predetermined target are having a conversation that corresponds to at least the first information. An outputter is controlled so as to output information based on the generated conversation data, thereby creating an impression on the user that the robot and the predetermined target are having the conversation that corresponds to at least the first information. The robot does not include a function that executes a conversation of a level greater than or equal to a level of the conversation based on the conversation data.

7 Claims, 17 Drawing Sheets

(51) Int. Cl.
 *B25J 9/00* (2006.01)
 *B25J 11/00* (2006.01)
(52) U.S. Cl.
 CPC ........... *B25J 9/1679* (2013.01); *B25J 9/1697* (2013.01); *B25J 11/001* (2013.01); *B25J 11/003* (2013.01); *G10L 15/28* (2013.01)

(56) References Cited

U.S. PATENT DOCUMENTS

2008/0205601 A1* 8/2008 Lavoie ................ H04M 3/4938
 379/88.01
2012/0316676 A1* 12/2012 Fouillade ............... B25J 9/1697
 700/246
2016/0346917 A1* 12/2016 Ho ......................... B25J 13/085

* cited by examiner

FIG.3

TOPIC: INTIMACY OF COMMUNICATION

| LEVEL | PARTNER LEVEL | UTTERANCE CONTENT | RESPONSE CONTENT | ... |
|---|---|---|---|---|
| 5 | 5 | [I'm] happy because [my] owner plays with [me] a lot! | That's nice. [My] owner plays with [me] a lot too! | ... |
| 5 | 1 | [I'm] happy because [my] owner plays with [me] a lot! | That must be nice. [My] owner doesn't play with [me] at all. | ... |
| ⋮ | ⋮ | ⋮ | ⋮ | ⋮ |
| 1 | 1 | [I'm] sad because [my] owner never plays with [me]. | Really? [Me] too. [I] wish [my] owner would play with [me] more. | ... |

TOPIC: WEATHER

| WEATHER | PARTNER WEATHER | UTTERANCE CONTENT | RESPONSE CONTENT | ... |
|---|---|---|---|---|
| SUNNY | SUNNY | Today is nice and sunny! | Really? The weather is nice here too. | ... |
| SUNNY | RAIN | Today is nice and sunny! | That's nice. It's raining and there is nothing to do here. | ... |
| ⋮ | ⋮ | ⋮ | ⋮ | ⋮ |
| RAIN | RAIN | [I'm] depressed because it's raining. | Really? It's raining here too. [I] hope it is sunny tomorrow. | ... |

TOPIC: SPECIAL DAY

| TYPE | UTTERANCE CONTENT | RESPONSE CONTENT | ... |
|---|---|---|---|
| CHRISTMAS (12/24 or 25) | Merry Christmas! (Christmas card attached) | A Christmas card for [me]? Thank you! | ... |
| BIRTHDAY (BIRTHDAY OF PARTNER) | Happy birthday! | You remembered [my] birthday! Thank you! | ... |
| ⋮ | ⋮ | ⋮ | ⋮ |

| ID | ICON | COUNTRY | GENDER | BIRTHDAY | HOBBIES | ... |
|---|---|---|---|---|---|---|
| GladDog | 🐶 | JAPAN | MALE | MAY 5 | READING BOOKS, TENNIS | ... |
| HappyCat | 🐱 | AMERICA | FEMALE | MARCH 3 | READING BOOKS, TENNIS | ... |
| ⋮ | ⋮ | ⋮ | ⋮ | ⋮ | ⋮ | ⋮ |

| ID | TIME AND DATE | NUMBER OF TIMES SPOKEN TO | NUMBER OF TIMES GAZED AT | NUMBER OF TIMES PICKED UP | WEATHER | ... |
|---|---|---|---|---|---|---|
| GladDog | 2017/12/25 1:00 PM | 5 | 3 | 3 | SUNNY | ... |
| HappyCat | 2017/12/24 8:00 PM | 0 | 0 | 0 | RAIN | ... |
| ⋮ | ⋮ | ⋮ | ⋮ | ⋮ | ⋮ | ⋮ |

TOPIC: INTRODUCTION OF ID OF ONWER

| SNS | UTTERANCE CONTENT | RESPONSE CONTENT | ... |
|---|---|---|---|
| SAME | [My] owner uses the SNS [name of SNS] under the ID [ID on SNS]. | Is that so? [My] owner uses that SNS too [My] owner's ID is [ID on that SNS]. | ... |
| DIFFERENT | [My] owner uses the SNS [name of SNS] under the ID [ID on SNS]. | Is that so? [My] owner uses the SNS [name of SNS] under the ID [ID on SNS]. | ... |
| ⋮ | ⋮ | ⋮ | ⋮ |

TOPIC: HOBBIES OF ONWER

| HOBBIES | PARTNER HOBBIES | UTTERANCE CONTENT | RESPONSE CONTENT | ... |
|---|---|---|---|---|
| READING BOOKS | READING BOOKS | One of [my] owner's hobbies is reading books. | Reading books is [my] owner's hobby too. Let's share our favorite authors and books. | ... |
| READING BOOKS | TENNIS | One of [my] owner's hobbies is reading books. | That's nice. [My] owner's hobby is tennis | ... |
| TENNIS | TENNIS | One of [my] owner's hobbies is tennis. | That's nice. [My] owner's hobby is tennis too. It would be fun to play tennis together someday. | ... |
| ⋮ | ⋮ | ⋮ | ⋮ | ⋮ |

CONVERSATION OUTPUT SYSTEM, CONVERSATION OUTPUT METHOD, AND NON-TRANSITORY RECORDING MEDIUM

CROSS-REFERENCE TO RELATED APPLICATIONS

This application claims the benefit of Japanese Patent Application No. 2018-022982, filed on Feb. 13, 2018, and Japanese Patent Application No. 2018-218848, filed on Nov. 22, 2018, of which the entirety of the disclosures is incorporated by reference herein.

FIELD

This application relates generally to a conversation output system, a conversation output method, and a non-transitory recording medium.

BACKGROUND

Robots that imitate animals are popular. These types of robots are called electronic pets and have appearances that are lovable to users. There are also robots that recognize the speech of the user, move in accordance with user commands, and converse with other robots. For example, Unexamined Japanese Patent Application Kokai Publication No. 2003-205483 describes a robot system in which a plurality of robots converse with each other.

SUMMARY

A conversation output system of the present disclosure for a robot without a function that executes a conversation of a level greater than or equal to a level of the conversation based on conversation data, includes:
a processor,
wherein
the processor
acquires first information that is information of at least one of information about a user of the robot or situation information being information about a situation around the robot,
generates, based on the acquired first information, the conversation data for creating an impression on the user that the robot and a predetermined target are having a conversation that corresponds to at least the first information, and
controls an outputter such that information that is based on the generated conversation data is output, thereby creating an impression on the user that the robot and the predetermined target are having the conversation that corresponds to at least the first information.

BRIEF DESCRIPTION OF THE DRAWINGS

A more complete understanding of this application can be obtained when the following detailed description is considered in conjunction with the following drawings, in which:

FIG. 3 is a drawing illustrating an example of data stored in a scenario storage according to Embodiment 1;

FIG. 4 is a drawing illustrating an example of data stored in a user profile storage according to Embodiment 1;

FIG. 5 is a drawing illustrating an example of data stored in a user situation storage according to Embodiment 1;

FIG. 12 is a drawing illustrating an example of the data stored in the scenario storage according to Modified Example 3 of Embodiment 1 of the present disclosure;

DETAILED DESCRIPTION

Figure 1:
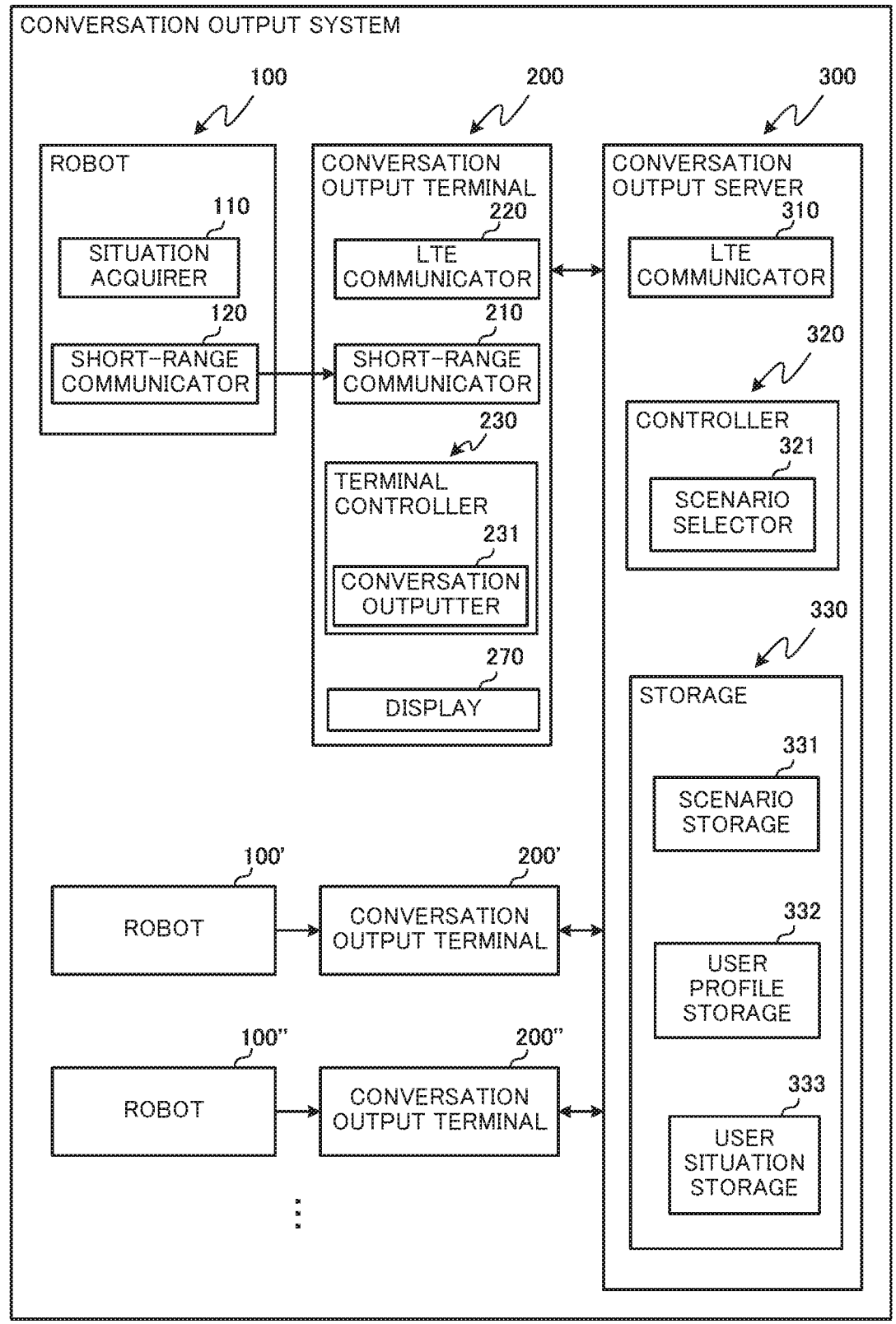
FIG. 1 is a drawing illustrating the functional configuration of a conversation output system according to Embodiment 1 of the present disclosure.

Hereinafter, conversation output systems according to embodiments of the present disclosure are described while referencing the drawings and tables. Note that, in the drawings, identical or corresponding components are marked with the same reference numerals.

Embodiment 1

The conversation output system according to Embodiment 1 of the present disclosure creates an impression in a user that a robot, which is incapable of conversing by speech in natural language, is conversing with another robot in natural language.

As illustrated in FIG. 1, the conversation output system 1000 according to Embodiment 1 of the present disclosure includes a robot 100, a conversation output terminal 200, and a conversation output server 300. The robot 100 and the conversation output terminal 200 form a pair by connecting wirelessly by short-range wireless communication. The conversation output system 1000 may include a plurality of pairs of the robot 100 and the conversation output terminal 200 (for example, the robot 100 and the conversation output terminal 200, a robot 100' and a conversation output terminal

200', a robot 100'' and a conversation output terminal 200''', and the like). An impression can be created on the user, via the conversation output terminal 200 and the conversation output server 300, that the robot 100 is conversing with another robot 100 in natural language.

The robot 100 is a pet-type robot that has an endearing shape, and includes a situation acquirer 110 and a short-range communicator 120 as functional constituents. These functional constituents are described later. Additionally, while not illustrated in the drawings, the robot 100 may include a clock capable of acquiring the current time and date.

Figure 2:
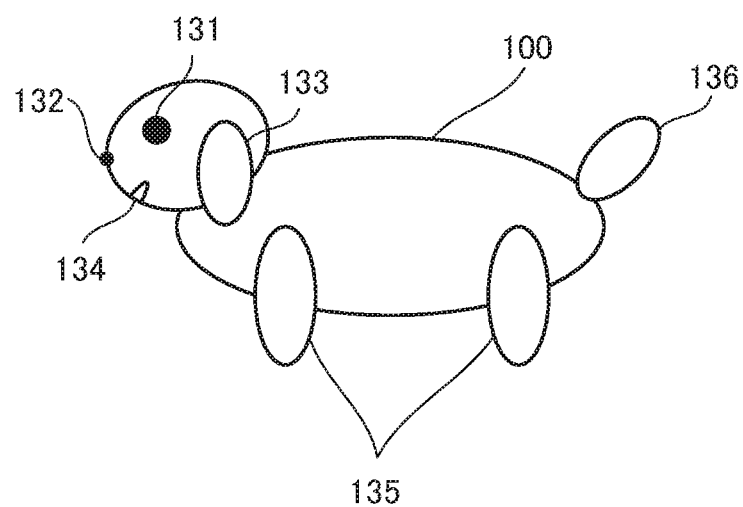
FIG. 2 is a drawing illustrating an example of the appearance of a robot according to Embodiment 1.

As illustrated in FIG. 2, the robot 100 includes human sensors 131 at the positions of the eyes, a camera 132 at the position of the nose, microphones 133 at the positions of the ears, and a speaker 134 at the position of the mouth. Moreover, the robot 100 includes legs 135 and a tail 136, and can express emotion by moving the legs 135 and/or the tail 136. For example, the robot 100 may express joy by moving the legs 135 rapidly in all directions and/or wagging the tail 136. While not illustrated in the drawings, the robot 100 also includes an acceleration sensor, a tactile sensor, and the like and, as such, can detect that the robot 100 has been picked up by the user. Moreover, while not illustrated in the drawings, the robot 100 also includes a temperature sensor, a humidity sensor, and the like and, as such, can acquire information about the environment around the robot 100.

Next, the functional configuration of the robot 100 is described. The situation acquirer 110 includes the human sensors 131, the camera 132, the microphones 133, the acceleration sensor, the tactile sensor, the temperature sensor, the humidity sensor, and the like. The situation acquirer 110 uses these sensors and the like to acquire situation information, that is, information about the situation around the robot 100. The situation information includes information about the user of the robot 100 and information about the robot 100. For example, the information about the user of the robot 100 includes information such as information that the user has approached the robot 100 acquired from the human sensors 131, information that the user gazed at the robot 100 acquired from the camera 132, information that the user spoke to the robot 100 acquired from the microphones 133, and information that the user picked up the robot 100 acquired from the acceleration sensor or the tactile sensor. The information about the robot 100 includes information such as the current temperature around the robot 100 acquired from the temperature sensor, the current humidity around the robot 100 acquired from the humidity sensor, and the current time and date of the region where the robot 100 is present acquired from the clock. For the information about the user, the situation information may also include information about frequency (number of times). Herein, the various sensors of the situation acquirer 110 are collectively referred to as a "first sensor."

A configuration is possible in which the situation information includes only the information about the user of the robot 100 or the information about the robot 100. For example, in a case in which, in the scenario selection processing (described later), only the information about the user of the robot 100 is used and the information about the robot 100 is not used, the situation information may include only the information about the user of the robot 100 and need not include the information about the robot 100.

The short-range communicator 120 includes a short-range wireless communication device (for example, a Bluetooth (registered trademark) communication device), and sends the situation information acquired by the situation acquirer 110 to the conversation output terminal 200. Accordingly, the short-range communicator 120 functions as a situation transmitter.

While the robot 100 includes the speaker 134, the robot 100 does not include functions for speaking in natural language. The robot 100 can output electronic sounds or sounds that imitate animal sounds from the speaker 134. Accordingly, the user listening to the sounds output from the robot 100 cannot conceive that the robot 100 is capable of comprehending words spoken by humans. The robot 100 may be provided with broken conversation ability like that of an infant or toddler, but the robot does not include a function that executes a conversation of a level greater than or equal to a level of the conversation based on the conversation data (described later).

Next, the conversation output terminal 200 will be described. The conversation output terminal 200 is a smartphone that includes a display 270. The conversation output terminal 200 includes a short-range communicator 210, a Long Term Evolution (LTE) communicator 770, and a conversation outputter 231 (terminal controller 230) as functional constituents. In addition, while not illustrated in the drawings, the terminal controller 230 includes the functions of a clock and is capable of acquiring the current time and date. In one example, the display 270 is configured from a liquid crystal display (LCD), an electroluminescence (EL) display, or the like. The display 270 displays content in accordance with commands from the conversation outputter 231 (the terminal controller 230). Thus, the display 270 functions as an outputter.

The short-range communicator 210 includes a short-range wireless communication device capable of communicating on the same communication standard as the short-range communicator 120. The short-range communicator 210 receives the situation information sent from the robot 100. Accordingly, the short-range communicator 210 functions as a situation receiver.

The LTE communicator 220 includes a device that communicates on the LTE communication standard, and communicates with the conversation output server 300. In one example, the LTE communicator 220 sends the situation information to the conversation output server 300. Additionally, the LTE communicator 220 receives scenario data (described later) sent by the conversation output server 300. Since the LTE communicator 220 communicates with the conversation output server 300, the LTE communicator 220 functions as a server communicator.

Depending on the robot 100 (for example, in some cases the robot may not include a clock or a temperature sensor), the situation information sent to the conversation output terminal 200 may not include information about the current time and date of the region where the robot 100 is present, the weather, the temperature, the news, and the like. In such cases, the conversation output terminal 200 appends, to the situation information, information about the current time and date of the region where the robot 100 is present, the weather, the temperature, the news, and the like, and sends the appended situation information to the conversation output server 300 via the LTE communicator 220. Note that the conversation output terminal 200 is capable of acquiring the current time and date by using the clock of the terminal controller 230. Moreover, the conversation output terminal 200 is capable of accessing the Internet by using the LTE communicator 220 to acquire the information about the weather, the temperature, the news, and the like.

The terminal controller 230 is configured from a central processing unit (CPU) implemented as a processor (second processor) and the like. The terminal controller 230 executes a program stored in a storage (not illustrated in the drawings) to realize the functions of the conversation outputter 231. In one example, after the user purchases the robot 100, the user can install a robot application on the conversation output terminal 200 (smartphone) by accessing the uniform resource locator (URL) of the robot application using the conversation output terminal 200. The functions of the conversation outputter 231 are realized by this robot application. Note that the URL of the robot application may be noted in the user manual or the like of the robot 100.

The conversation outputter 231 controls the display 270 to display conversation content, which creates an impression that the robot 100 is conversing in natural language with another robot 100', on the display 270. This control is carried out on the basis of scenario data (discussed later) received from the conversation output server 300 via the LTE communicator 220. The conversation outputter 231 can be implemented as SNS client software that accesses a social networking service (SNS) provided by the conversation output server 300.

An example is considered in which a screen is output that creates the impression that the robot 100 (wirelessly connected to the conversation output terminal 200) and the robot 100' (wirelessly connected to the conversation output terminal 200') are conversing. In this case, the conversation outputter 231 receives only utterance content of the robot 100 as the scenario data from the conversation output server 300, and sends the received scenario data as content to be written to the SNS provided by the conversation output server 300. The conversation outputter 231 of the conversation output terminal 200' wirelessly connected to the conversation partner (the robot 100') also receives only response content of the robot 100' as the scenario data from the conversation output server 300, and sends the received scenario data as content to be written to the SNS provided by the conversation output server 300.

Then, using the SNS functions of the conversation output server 300, the conversation outputter 231 implemented as the SNS client software outputs the utterance content of the robot 100 and the response content of the robot 100' to the display 270 of the conversation output terminal 200.

Next, the conversation output server 300 will be described. The conversation output server 300 is a cloud server on the Internet. The conversation output server 300 provides the SNS for the robots 100. An impression can be created on the user that the robot 100 is conversing (chatting) with the other robot 100' by the conversation output terminal 200, which is wirelessly connected to the robot 100, accessing the SNS provided by the conversation output server 300.

The conversation output server 300 includes, as functional constituents, a LTE communicator 310, a scenario selector 321 (controller 320), a scenario storage 331 (storage 330), a user profile storage 332 (storage 330), and a user situation storage 333 (storage 330).

The LTE communicator 310 includes a device that communicates on the LTE communication standard, and communicates with the conversation output terminal 200. In one example, the LTE communicator 310 receives the situation information sent by the conversation output terminal 200. Additionally, the LTE communicator 310 sends the scenario data to the conversation output terminal 200. Thus, since the LTE communicator 310 communicates with the conversation output terminal 200, the LTE communicator 310 functions as a terminal communicator.

The controller 320 is configured from a CPU implemented as a processor (first processor), and executes a program stored in the storage 330 to realize the functions of the scenario selector 321. Additionally, the controller 320 includes a clock (not illustrated in the drawings), and is capable of acquiring the current time and date of the region where the robot 100 is present.

The scenario selector 321 selects, on the basis of the situation information received by the LTE communicator 310, the scenario data stored in the scenario storage 331. As described later, when selecting the scenario data for creating an impression on the user that the robot 100 and the robot 100' are conversing, the scenario selector 321 uses the situation information of the robot 100' in addition to the situation information of the robot 100. To distinguish between these pieces of situation information, the situation information of the robot 100 is referred to as "first situation information" and the situation information of the robot 100' is referred to as "second situation information."

The storage 330 is configured from read-only member (ROM), random access memory (RAM), and the like, and functionally includes the scenario storage 331, the user profile storage 332, and the user situation storage 333. Programs to be executed by the CPU of the controller 320 and data needed in advance to execute these programs are stored in the ROM. Data that is created or modified during the execution of the programs is stored in the RAM.

As illustrated in FIG. 3, the utterance content by the robot 100 and the corresponding response content by the conversation partner (in this case, the robot 100'), which are based on the situation information, are stored in the scenario storage 331 and the like by topic of conversation. Each pair of contents uttered by the robot 100 and the conversation partner is referred to as a scenario.

For example, the uppermost table in FIG. 3 is an example of the scenario data for a case in which the topic of conversation is the intimacy of communication with the owner (the users of the robot 100 and the robot 100', respectively). In FIG. 3, the scenario data (the utterance content of the robot 100 and the corresponding response content of the robot 100') is defined depending on an intimacy level of the robot 100 and an intimacy level of the robot 100'. The intimacy level represents the degree of interaction of the user with the robot 100 (defined by comprehensively accounting for the number of times the user speaks to robot 100, the number of times the user gazes at the face of the robot 100, the number of times the user picks up the robot 100, and the like).

For example, the intimacy level is 1 when there is no interaction (the user does not speak to the robot 100 and dose not pick up the robot 100). The intimacy level is 5 when the user frequently interacts with the robot 100 (for example, the number of times the user speaks to the robot 100+the number of times the user gazes at the face of the robot 100+the number of times the user picks up the robot 100 is 10 or greater). In FIG. 3, the portions where "[I]" or the like is written indicate where a word expressing a personal pronoun is to be inserted. In countries where personal pronouns are gender-based, these portions change depending on the gender of the robot 100. For example, when the country of residence is Japan, the personal pronoun "watashi" is expressed as "boku" when the robot 100 is male and "watashi" when the robot 100 is female. The name of the pet may also be used in these portions. For example, when the name of the pet is "GladDog," the wording may change to, "That's nice! GladDog's owner doesn't play at all", or the like.

The middle table in FIG. 3 is an example of scenario data for a case in which the topic of conversation is the weather. In this example, when the weather included in the situation information of the robot 100 (the first situation information) is sunny and the weather included in the situation information of the robot 100' (the second situation information) is rain, the utterance content of the robot 100 is defined as, "Today is nice and sunny!", and the response content of the robot 100' is defined as "That's nice. It's raining and there is nothing to do here."

The lower table in FIG. 3 is an example of scenario data for a case in which the topic of conversation is a special day. Since the current time and date of the robot 100 and the current time and date of the robot 100' only differ by the offset between the local time zones, the maximum difference between current times and dates is one day. Accordingly, in this example, the scenario data is defined while disregarding the time and date information included in the situation information of the robot 100'. Of course, the time difference may be considered and scenario data may be defined for a case in which the time and date included in the situation information of the robot 100' is one day before the time and date included in the situation information of the robot 100 and for a case in which the time and date included in the situation information of the robot 100' is one day after the time and date included in the situation information of the robot 100.

As illustrated in FIG. 4, a profile of the robot 100 and the user of the robot 100 is stored in the user profile storage 332. The profile includes an ID and an icon of the robot 100 for use on the SNS provided by the conversation output server 300, and the country of residence, the gender, the birthday, the hobbies, and the like of the user of the robot 100. In FIG. 4, only the gender, the birthday, and the like of the user are stored and, as such, the gender, the birthday, and the like of the robot 100 are treated as the same as the gender, the birthday, and the like of the user. However, a configuration is possible in which fields are separately provided in the user profile storage 332 for the gender, the birthday, and the like of the robot 100, and the gender and the birthday of the robot 100 are set independently from those of the user.

As illustrated in FIG. 5, situation information sent from each robot 100 (each conversation output terminal 200) is stored in the user situation storage 333. The user situation storage 333 is updated each time situation information is received from the various conversation output terminals 200. Additionally, the number of times spoken to, the number of times gazed at, and the like are reset to 0 each set period (for example, at midnight every day).

The controller 320 selects, on the basis of the information about the user stored in the user profile storage 332 and the situation information stored in the user situation storage 333, the scenario data stored in the scenario storage 331 to generate conversation data for creating an impression on the user that the robot 100 is having a conversation corresponding to the first information. Note that a configuration is possible in which the controller 320 selects, on the basis of only the information about the user stored in the user profile storage 332 or only the situation information stored in the user situation storage 333, the scenario data stored in the scenario storage 331. The information including either or both of the information about the user stored in the user profile storage 332 and the situation information stored in the user situation storage 333 is referred to as "first information."

In the conversation data generated by the controller 320, the situation information of the conversation partner of the robot 100 (here, the robot 100) and the information about the user of the robot 100' are also respectively stored in the user situation storage 333 and the user profile storage 332. While the information including either or both of the information about the user of the robot 100' and the situation information of the robot 100' can also be referred to as the first information, the information including either or both of the information about the user of the robot 100' and the situation information of the robot 100' is referred to as "second information." As a result the information including either or both of the information about the user of the robot 100' and the situation information of the robot 100' can be distinguished from the information including either or both of the information about the user of the robot 100 and the situation information of the robot 100 (the first information).

Next, conversation processing in which the robot 100 converses with another robot 100 via the conversation output terminal 200 and the conversation output server 300 is described. This conversation processing includes three thread groups, namely a thread group for situation information collection, a thread group for conversation request collection, and a thread group for conversation content output. These three thread groups are not sequentially executed. Rather, the three thread groups are executed simultaneously, in parallel. The thread group for conversation content output results in the scenario data stored in the scenario storage 331 being sent (after being edited as desired) to the conversation output terminal 200 that is wirelessly connected to the robot 100. Then, a screen is output from the conversation output terminal 200. This screen creates an impression that the robot 100 is having a conversation (a chat) based on this scenario data with the conversation partner (for example, the robot 100') on the SNS provided by the conversation output server 300. First, the thread group for situation information collection is described while referencing FIG. 6.

Figure 6:
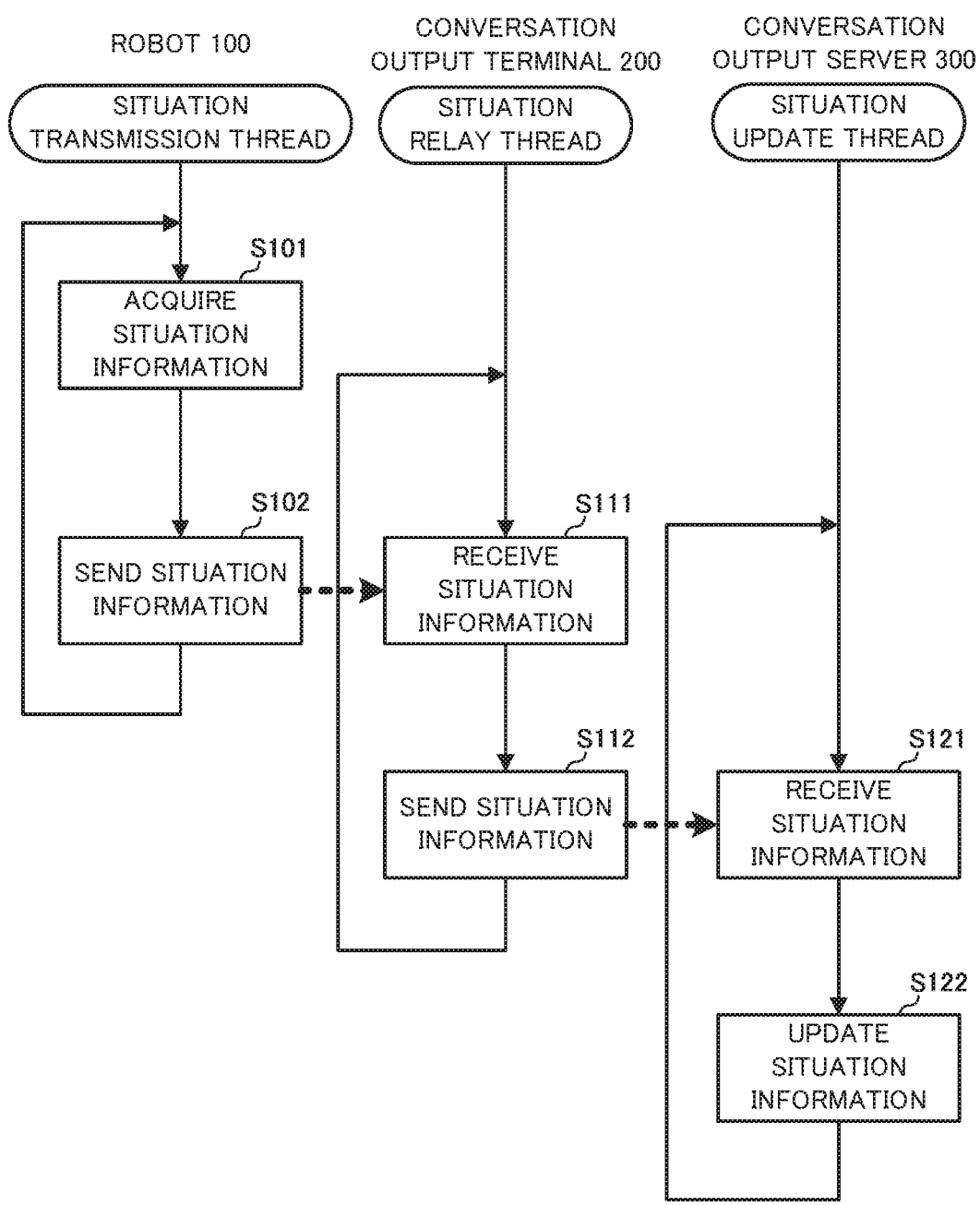
FIG. 6 is a flowchart of a thread group for situation information collection in the conversation processing according to Embodiment 1.

When the power supply of the robot 100 is turned ON, the situation transmission thread illustrated by the flowchart on the left side of FIG. 6 is started. Additionally, when the power supply of the conversation output terminal 200 is turned ON, the situation relay thread illustrated by the flowchart in the center of FIG. 6 is started. Moreover, when the power supply of the conversation output server 300 is turned ON, the situation update thread illustrated by the flowchart on the right side of FIG. 6 is started. The dashed arrows in FIG. 6 indicate that data is sent and received from thread to thread.

In the situation transmission thread, the robot 100 acquires the situation information using the situation acquirer 110 (step S101). Then, the acquired situation information is sent to the conversation output terminal 200 via the short-range communicator 120 (step S102), and then step S101 is executed. In step S101, the robot 100 may be configured to constantly record (audio or video recording) the acquired situation information and appropriately execute step S102, or the robot 100 may be configured to send all of the recorded (audio or video recorded) data to the conversation output terminal 200 and analyze the sent data using the conversation output terminal 200.

In the situation relay thread, the conversation output terminal 200 waits until the situation information is sent from the robot 100, and receives the situation information using the short-range communicator 210 (step S111). Then, as desired, information such as the current time and date and the weather is appended to the received situation information and the appended situation information is sent to the conversation output server 300 via the short-range communicator 220 (step S112). Then, step S111 is executed.

In the situation update thread, the conversation output server 300 waits until the situation information is sent from the conversation output terminal 200, and receives the situation information using the LTE communicator 310 (step S121). Then, the situation information stored in the user situation storage 333 is updated using the received situation information (step S122), and step S121 is executed.

In cases where there are multiple pairs of the robot 100 and the conversation output terminal 200, the aforementioned processing is carried out by each of the robots 100 and each of the conversation output terminals 200 that communicates with or is connected to the robot 100. Thus, situation information about the user of each of the robots 100 is accumulated in the user situation storage 333 of the conversation output server 300.

This ends the description of the thread group for situation information collection. Next, the thread group for conversation request collection is described while referencing FIG. 7.

Figure 7:
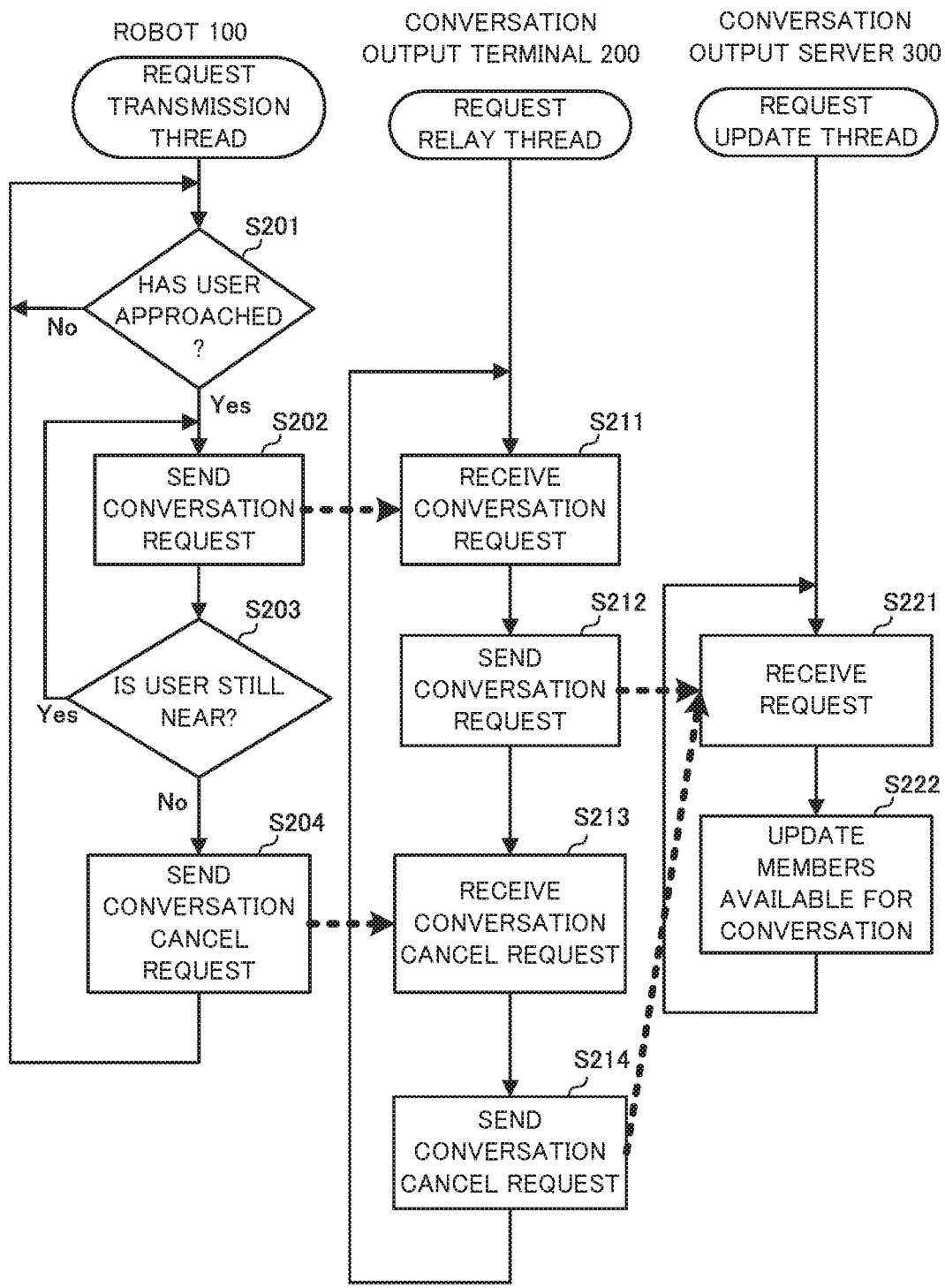
FIG. 7 is a flowchart of a thread group for conversation request collection in the conversation processing according to Embodiment 1.

When the power supply of the robot 100 is turned ON, the request transmission thread illustrated by the flowchart on the left side of FIG. 7 is started. Additionally, when the power supply of the conversation output terminal 200 is turned ON, the request relay thread illustrated by the flowchart in the center of FIG. 7 is started. Moreover, when the power supply of the conversation output server 300 is turned ON, the request update thread illustrated by the flowchart on the right side of FIG. 7 is started. The dashed arrows in FIG. 7 indicate that data is sent and received from thread to thread.

In the request transmission thread, the robot 100 uses the human sensors 131 of the situation acquirer 110 to determine whether the user has approached the robot 100 (step S201). If the user has not approached the robot 100 (step S201; No), step S201 is executed. If the user has approached the robot 100 (step S201; Yes), the robot 100 sends a conversation request packet to the conversation output terminal 200 via the short-range communicator 120 (step S202). The conversation request packet is a packet that indicates that the robot 100 desires to converse with the other robot 100'. The conversation request packet includes the information about the ID of the robot 100.

Then, the robot 100 uses the human sensors 131 of the situation acquirer 110 to determine whether the user is still near (step S203). If the user is still near the robot 100 (step S203; Yes), step S203 is executed. If the user is no longer near the robot 100 (step S203; No), the robot 100 sends a conversation cancel request packet to the conversation output terminal 200 via the short-range communicator 120 (step S204). The conversation cancel request packet is a packet that is sent to cancel the conversation request packet previously sent by the robot 100. The conversation cancel request packet includes the ID of the robot 100. Thereafter, step S201 is executed.

In the situation relay thread, the conversation output terminal 200 waits until the conversation request packet is sent from the robot 100, and receives the conversation request packet using the short-range communicator 210 (step S211). Then, the conversation request packet is sent to the conversation output server 300 via the LTE communicator 220 (step S212). Then, the conversation output terminal 200 waits until the conversation cancel request packet is sent from the robot 100, and receives the conversation cancel request packet using the short-range communicator 210 (step S213). Then, the conversation cancel request packet is sent to the conversation output server 300 via the LTE communicator 220 (step S214), and step S211 is executed.

In the request update thread, the conversation output server 300 waits until the conversation request packet or the conversation cancel request packet (hereinafter referred to collectively as "request packet") is sent from the conversation output terminal 200, and receives the request packet using the LTE communicator 310 (step S221). Then, the received request packet is used to update information of members available for conversation (step S222), and step S221 is executed.

The information of the members available for conversation is a set of IDs of robots 100 (that is, the robot loft) that have sent conversation request packets. When a conversation request packet is received, the conversation output server 300 adds the ID included in the conversation request packet to the information of the members available for conversation. When a conversation cancel request packet is received, the conversation output server 300 deletes the ID included in the conversation cancel request packet from the information of the members available for conversation.

In cases in which there is a plurality of pairs of the robot 100 and the conversation output terminal 200, the aforementioned processing is carried out by each of the robots 100 and the conversation output terminal 200 that communicates with or is connected to the robot 100. Accordingly, the conversation output server 300 has, as the information of the members available for conversation, the IDs of all of the robots 100 the have users near at that time.

This ends the description of the thread group for conversation request collection. Note that the processing described above is merely an example. The robot 100 may send the conversation request packet regardless of whether the user is near the robot 100 (for example, periodically). Next, the thread group for conversation content output is described while referencing FIG. 8.

Figure 8:
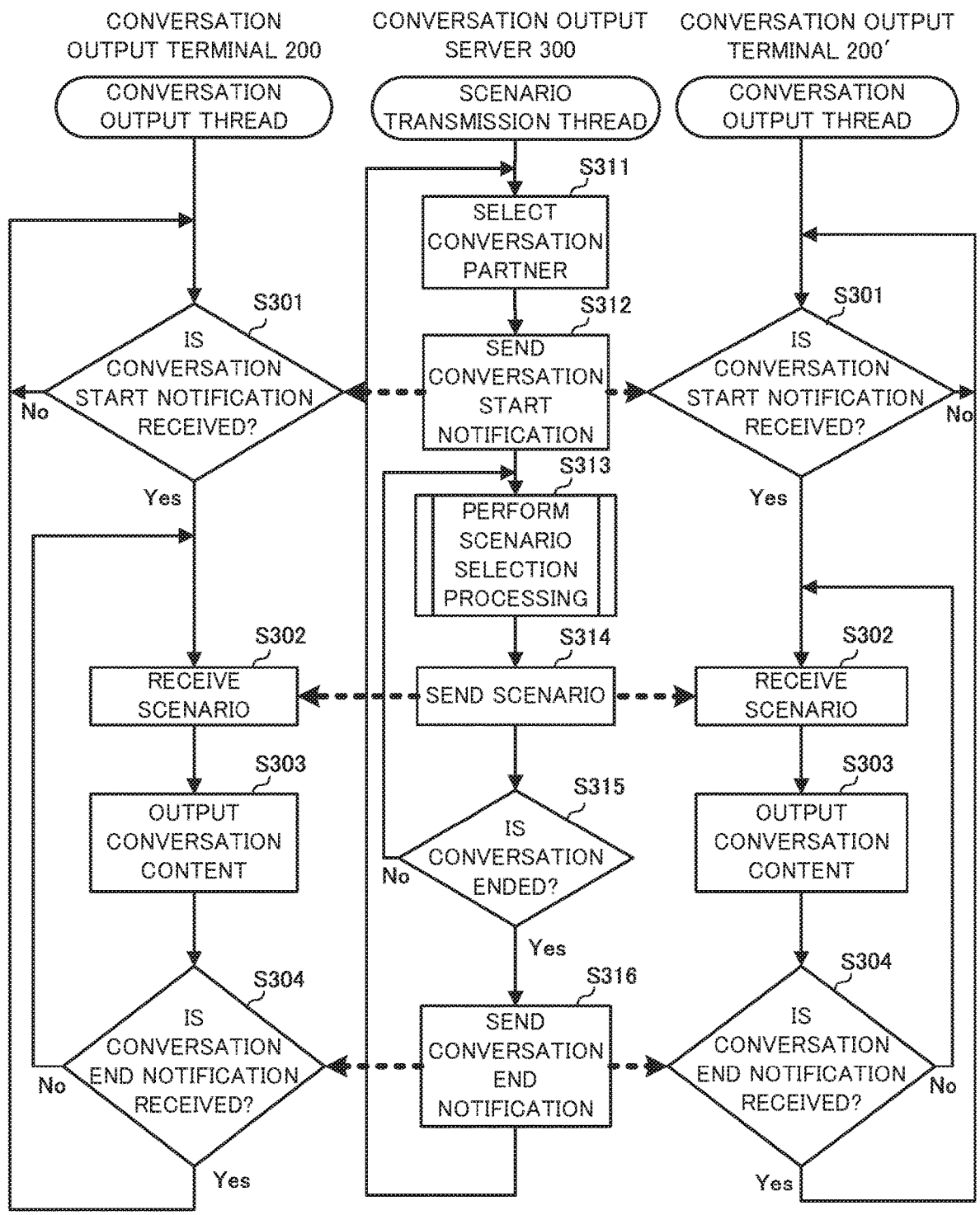
FIG. 8 is a flowchart of a thread group for conversation content output in the conversation processing according to Embodiment 1.

When the power supply of the conversation output terminal 200 is turned ON, the conversation output thread illustrated by the flowchart on the left side of FIG. 8 is started. Additionally, when the power supply of the conversation output server 300 is turned ON, the scenario transmission thread illustrated by the flowchart in the center of FIG. 8 is started. Note that the conversation output thread illustrated by the flowchart on the right side of FIG. 8 is the same as the flowchart on the left side of FIG. 8. It is assumed that the flowchart on the right side is executed by the conversation output terminal 200' that is wirelessly connected to the other robot 100', which is the conversation partner of the robot 100 that is wirelessly connected to the conversation output terminal 200. The dashed arrows in FIG. 8 indicate that data is sent and received from thread to thread.

First, in the scenario transmission thread, the conversation output server 300 selects the conversation partners by arbitrarily selecting two IDs from among the IDs of the robots 100 included in the information of the members available for conversation that is updated by the request update thread described above (step S311). In cases in which there is only one ID of a robot 100 in the information of the members available for conversation, a conversation between that robot 100 and a virtual (nonexistent) robot 100 may be provided. The scenario storage 331 illustrated in FIG. 3 only includes scenario data for conversations between two robots 100. However, in cases in which the scenario storage 331 includes scenario data for conversations between three or more robots 100, the conversation partners may be selected by selecting three or more IDs in step S311.

In addition, a configuration is possible in which the conversation partners are appropriately selected on the basis of recent conversation history. In one example, the user registers, in advance, conversation partner selection preferences (for example, if the user desires the robot 100 to converse with the robot 100' of an acquaintance, or if the user desires the robot 100 to converse with a robot 100" of a stranger) in the user profile storage 332. In such cases, it is thought that the conversation partners selected by the conversation output server 300 will be robots that have users with the same conversation partner selection preferences. Note that the virtual (nonexistent) robot 100 may be implemented as an AI conversation engine on the SNS. This conversation engine may be provided in the conversation output server 300 or may be realized on another computer that is connected across a network.

Next, the controller 320 of the conversation output server 300 sends, via the LTE communicator 310, a conversation start notification packet to the conversation output terminal 200 that is connected to each of the robots 100 selected in step S311 (step S312). The conversation start notification packet is a packet that includes the ID of each of the robots 100 that is to be a conversation partner, and notifies each of the conversation output terminals 200 that scenario data indicating the conversation content will be sent thereafter. Then, using the functions of the SNS provided by the conversation output server 300, the conversation output server 300 starts a conversation (chat) between the robots 100 corresponding to the IDs included in the conversation start notification packet.

Next, the scenario selector 321 carries out scenario selection processing for selecting scenario data from the scenario storage 331 (step S313). Details about the scenario selection processing will be described later while referencing FIG. 9. Then, the controller 320 sends the scenario data to each of the conversation output terminals 200 via the LTE communicator 310 (step S314).

The scenario data sent at this point differs depending on the destination conversation output terminal 200. Scenario data corresponding to the utterance content in the scenario storage 331 (FIG. 3) is sent to the conversation output terminal 200 that utters first. Scenario data corresponding to the response content in the scenario storage 331 (FIG. 3) is sent to the conversation output terminal 200' that responds to the conversation output terminal 200 that utters first.

Next, the controller 320 determines whether the conversation is ended (step S315). Typically, the controller 320 ends the conversation after selecting and sending two pieces of scenario data from the scenario storage 331. If the conversation is not to be ended (step S315; No), step S313 is executed.

If the conversation is to be ended (step S315; Yes), a conversation end notification packet is sent to each of the conversation output terminals 200 via the LTE communicator 310 (step S316), and step S311 is executed. The conversation end notification packet is a packet that includes the ID of each of the robots 100 that is a conversation partner, and notifies that the sending of the scenario data, performed up to that point, will be ended.

This ends the description of the operations of the scenario transmission thread. Next, the operations of the conversation output terminal 200, namely a conversation content output thread (the flowchart on the left side of FIG. 8), corresponding to the scenario transmission thread will be described. Note that the operations of the conversation output terminal 200' (the flowchart on the right side of FIG. 8) are the same as the operations of the conversation output terminal 200.

First, the terminal controller 230 of the conversation output terminal 200 determines whether the conversation start notification packet is received via the LTE communicator 220 (step S301) If the conversation start notification packet is not received (step S301; No), step S301 is executed. If the conversation start notification packet is received (step S301; Yes), the terminal controller 230 prepares a conversation (chat) with the ID included in the conversation start notification packet, and receives, via the LTE communicator 220, the scenario data sent by the conversation output server 300 (step S302).

Then, the conversation outputter 231 sends that scenario data to the SNS of the conversation output server 300 via the LTE communicator 220. Then, the conversation outputter 231 implemented as the SNS client software outputs data, which is returned from the SNS, to the display 270 of the conversation output terminal 200, thereby outputting the conversation content on the SNS (step S303). Note that the SNS provided by the conversation output server 300 may have a function for translating the data to be returned to the client software. In this case, the translation is performed on the basis of information about the country of residence of the accessing user. In cases in which the SNS has this translation function, the conversation content is output to the display 270 of each conversation output terminal 200 in the natural language used by that user.

A configuration is possible in which the terminal controller 230 outputs the conversation content and, thereafter, notifies the robot 100, via the short-range communicator 210, of the origin of the utterance content. When the robot 100 receives a notification via the short-range communicator 120 that the utterance content of a conversation partner is output, the robot 100 may wag the tail 136, for example. Thus, since the robot 100 wags the tail 136 each time a message from a conversation partner arrives, an impression can be created on the user that the robot 100 is reading messages from conversation partners.

Then, the terminal controller 230 determines whether the conversation end notification packet is received via the LTE communicator 220 (step S304). If the conversation end notification packet is not received (step S304; No), step S302 is executed. If the conversation end notification packet is received (step S304; Yes), the conversation is ended and step S301 is executed.

This ends the description of the thread group for conversation content output. As a result of the processing described above, the conversation content with the conversation partners is output to the displays 270 of all of the conversation output terminals 200 that are conversation partners (the conversation output terminals 200 to which the robots 100, indicated by the IDs selected in step S311, are wirelessly connected) selected by the conversation output server 300 in step S311 of the scenario transmission thread.

Figure 9:
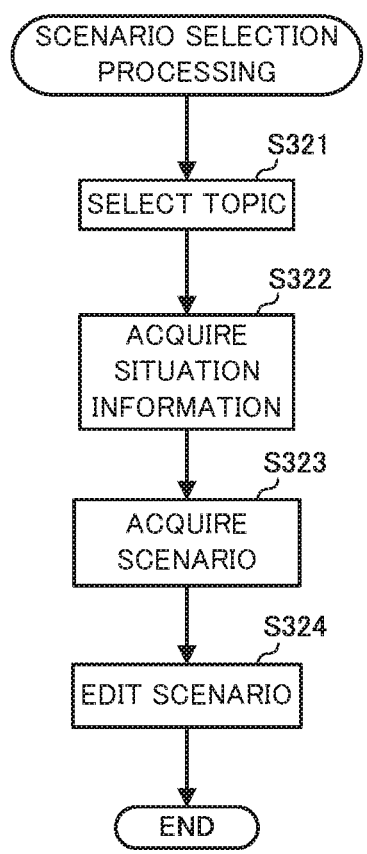
FIG. 9 is a flowchart of scenario selection processing according to Embodiment 1.

Next, details of the scenario selection processing of step S313 of the scenario transmission thread of the conversation output server 300 are described while referencing FIG. 9.

First, the scenario selector 321 selects a topic of conversation (step S321). Any method may be used for the selection. For example, the topic of conversation may be randomly selected from topics stored in the scenario storage 331. However, topics that have been recently selected (for example, the five most recent topics) are removed from the selection candidates to prevent the same scenario data from being selected.

Next, the scenario selector 321 references the user situation storage 333 to acquire the situation information sent from each robot 100 (step S322). In one example, the scenario selector 321 acquires the situation information of the robot 100 (the first situation information) and the situation information of the robot 100' (the second situation information). The scenario selector 321 references the scenario storage 331 and acquires the scenario data on the basis of the selected topic and the acquired situation information (the first situation information and the second situation information). Note that, when a virtual (nonexistent) robot 100 is selected as the conversation partner in the conversation partner selection step (step S311), the situation information of the conversation partner may be randomly set in step S322.

A configuration is possible in which, in step S322, the scenario selector 321 references the user profile storage 332 in addition to or in place of the situation information to acquire the information about the user of each of the robots 100. In such cases, in step S323, the scenario selector 321 references the scenario storage 331 to acquire the scenario data on the basis of the topic selected in step S321 and either or both of the acquired situation information and the information about the user. For example, in step S322, the scenario selector 321 acquires either or both of the situation information of the robot 100 and the information about the user of the robot 100 (the first information) and either or both of the situation information of the robot 100' and the information about the user of the robot 100' (the second information). Then, the scenario selector 321 references the scenario storage 331 and acquires the scenario data on the basis of the selected topic and the acquired first information and second information.

Then, as desired, the scenario selector 321 edits the acquired scenario data (step S324). For example, in a case in which the text "[I]" or the like is included in the scenario data, processing is performed to replace this portion with "watashi" or "boku" depending on gender, when the country of residence is Japan. Additionally, translation processing is performed when the language of the country of residence of the user at the destination of the scenario data differs from the language of the scenario data. Note that the scenario selector 321 acquires the information about the country of residence of the user from the user profile storage 332, and acquires the language of the scenario data from the scenario storage 331. As such, the scenario selector 321 can determine whether the language of the country of residence of the user differs from the language of the scenario data. Additionally, in step 321, the scenario selector 321 adds the icon of the robot that performs the uttering to make it possible to distinguish which utterance contents belong to each of the robots 100. As a result of this processing, conversation data to be presented to the user is generated. Note that a configuration is possible in which scenario data for various countries is stored in advance in the scenario storage 331 and, when acquiring the scenario data in step S323, scenario data written in the language of the country of residence of the user at the destination of the scenario data is acquired.

Then, the scenario selection processing is ended. Typically, the controller 320 ends the conversation after two pieces of scenario data are selected and sent from the scenario storage 331. As such, the scenario selection processing described above is performed two times per conversation. Specifically, a first topic is selected in the first instance of step S321, a first scenario data is acquired in step S323 on the basis of the first topic, and ultimately, first conversation data is generated. Then, a second topic is selected in the second instance of step S321, a second scenario data is acquired in step S323 on the basis of the second topic, and ultimately, second conversation data is generated.

As a result of the scenario selection processing described above, the conversation output server 300 can send, to the conversation output terminal 200, scenario data whereby a conversation based on the selected topic and the acquired situation information can be generated.

Next, a specific example of the processing by the thread group for conversation content output (FIG. 8) is described. In this example, it is assumed that the robot 100 is near the conversation output terminal 200 and the robot 100 has the user profile for which the ID, illustrated in FIG. 4, is GladDog. Additionally, it is assumed that the robot 100' is near the conversation output terminal 200' and the robot 100' has the user profile for which the ID, illustrated in FIG. 4, is HappyCat. Moreover, it is assumed that the users are respectively near the robot 100 and the robot 100' and the robots 100, 100' have sent conversation request packets.

In step S311, the robot 100 whose ID is GladDog and the robot 100' whose ID is HappyCat are selected as conversation partners each other. The situation information of these robots 100, 100' is the content illustrated in FIG. 5. In the first instance of step S321, intimacy of communication is selected as the topic. In the second instance of step S321, a special day is selected as the topic.

Thus, in the first instance of step S322, respective intimacy levels are calculated from the situation information illustrated in FIG. 5. For example, when expressing the intimacy level as the number of times spoken to+the number of times gazed at+the number of times the picked up (where the intimacy level (the sum of the numbers) greater than 5 are treated as 5, and the intimacy level less than 1 are treated as 1), the intimacy level of GladDog is 5 and the intimacy level of HappyCat is 1. In this case, based on FIG. 3, in step S323, the utterance content of GladDog is, "[I'm] happy because [my] owner plays with [me] a lot!", and the response content of HappyCat is, "That must be nice. [My] owner doesn't play with [me] at all." It is clear from the user profile storage 332 illustrated in FIG. 4 that the country of residence of the robot 100 whose ID is GladDog is Japan and, as such, the scenario data sent to the conversation output terminal 200 that is connected to the robot 100 is translated into Japanese in step S324.

Moreover, based on FIG. 4, HappyCat is female and, as such, the response content "That must be nice. [My] owner doesn't play with [me] at all" is edited to "That must be nice. My owner doesn't play with me at all" in step S324. Additionally, it is clear from the user profile storage 332 illustrated in FIG. 4 that the robot 100' whose ID is HappyCat is American and, as such, the scenario data sent to the conversation output terminal 200' that is connected to the robot 100' is translated into English.

In the next step S322, it is clear from the situation information illustrated in FIG. 5 that today is Christmas. As such, based on FIG. 3, in step S323, the utterance content of GladDog is, "Merry Christmas!", and a Christmas card is attached as an image file. Here, the response content of HappyCat is, "A Christmas card for [me]? Thank you!" In this case, in step S324, there is no need to edit the first person terms, and the scenario data to be sent to the conversation output terminal 200' is translated into English.

Figure 10:
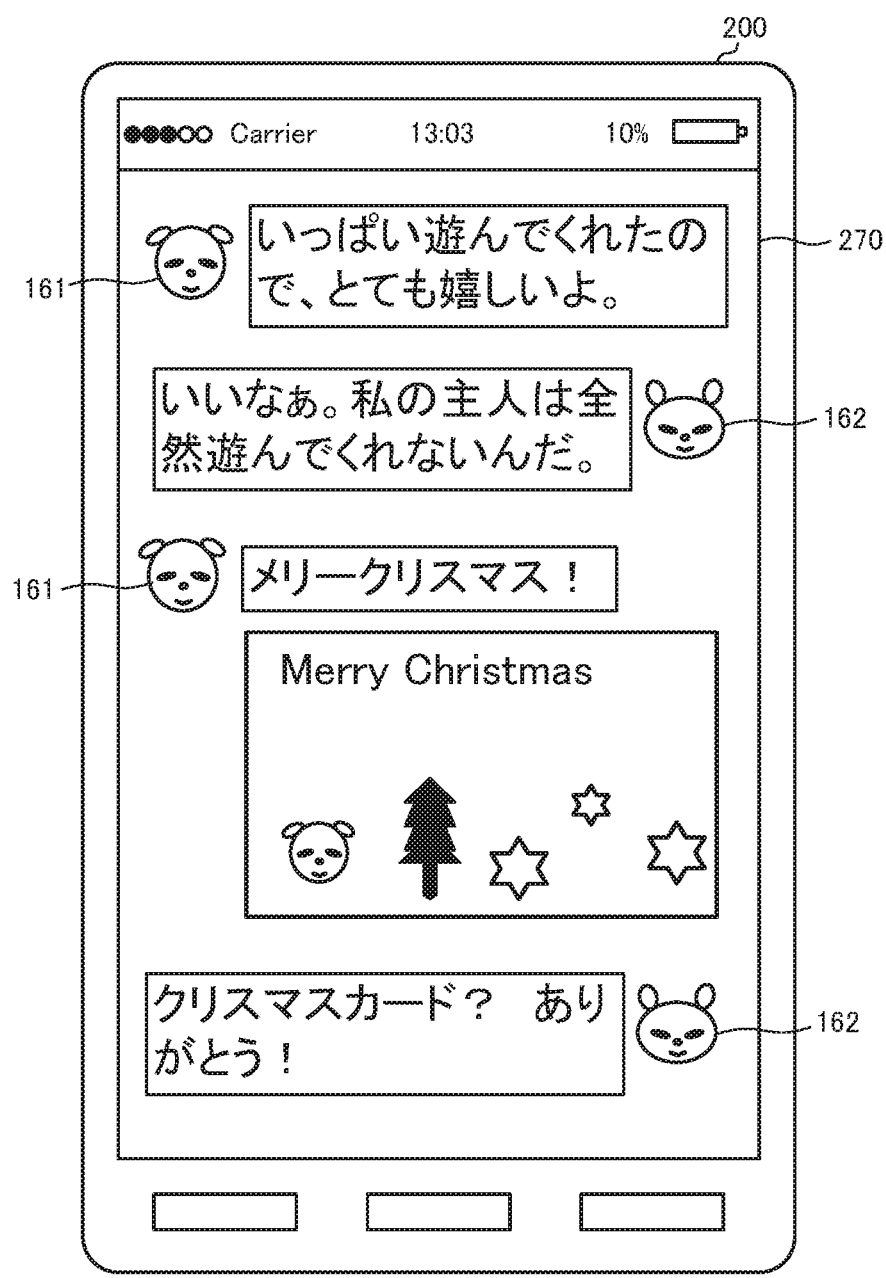
FIG. 10 is a drawing illustrating an example of the conversation content output to one conversation output terminal in the conversation output system according to Embodiment 1 of the present disclosure.
Figure 11:
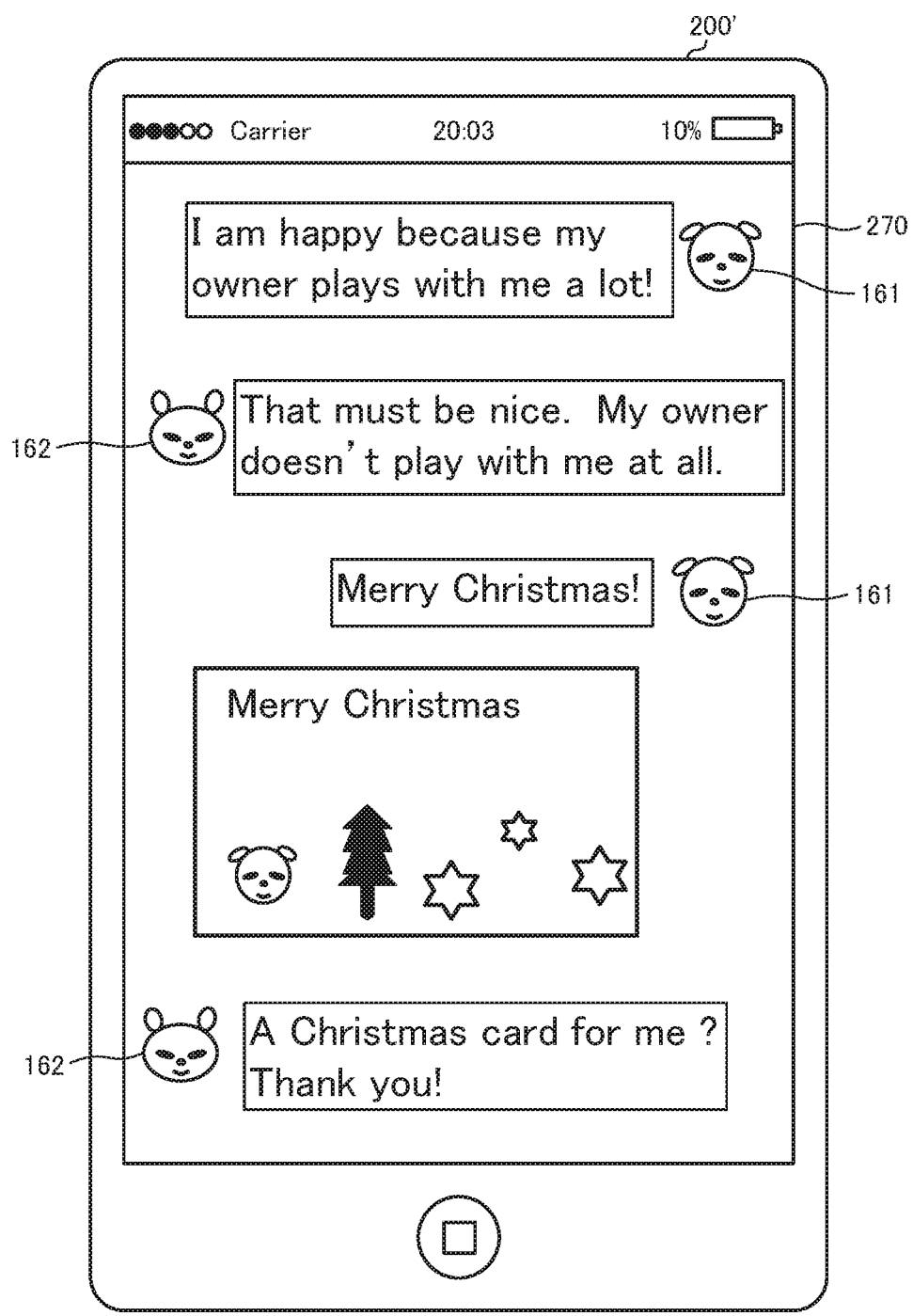
FIG. 11 is a drawing illustrating an example of the conversation content output to another conversation output terminal in the conversation output system according to Embodiment 1.

As a result of the processing described above, the screen displayed on the conversation output terminal 200 that is connected to the robot 100 will be as illustrated in FIG. 10, and the screen displayed on the conversation output terminal 200' that is connected to the robot 100' will be as illustrated in FIG. 11. In both drawings, the conversation content is displayed together with the icon 161 that represents the robot 100 and the icon 162 that represents the robot 100' respectively. It is clear that this configuration makes it possible to distinguish which utterance content belongs to the robot 100 and which utterance content belongs to the robot 100'. Since the country of residence of the user of the robot 100 is Japan, the conversation content illustrated in FIG. 10 is displayed in Japanese. Since the country of residence of the user of the robot 100' is America, the conversation content illustrated in FIG. 11 is displayed in English.

As described above, in the present embodiment, text is displayed on the displays of the conversation output terminals 200, 200' of the users, and this text creates an impression on the users that the robot 100 and the robot 100' are conversing. Accordingly, an impression can be created on the users that the robots 100, 100' have advanced communication abilities.

Modified Example 1 of Embodiment 1

When, in the conversation on the first topic, one conversation partner is happy (GladDog in the aforementioned example) and the other conversation partner is sad (HappyCat in the aforementioned example) as described above in the specific example, when changing to the next topic, a transition statement such as, "It'll be okay. Cheer up!" may be added at the beginning of the utterance content of the one conversation partner. By inserting the transition statement that connects the topics, the flow of conversation can be made to appear more natural. Next, Modified Example 1 of Embodiment 1, in which such processing is carried out, will be described.

In the Modified Example 1 of Embodiment 1, the storage 330 includes, as a functional constituent of the conversation output server 300, a transition statement storage (not illustrated in the drawings) that stores transition statements corresponding to the moods of the conversation partners, namely, the robot 100 and the robot 100'. Moreover, mood information indicating the mood of each of the conversation partners is stored in each scenario data in the scenario storage 331. Note that this mood information can be regarded as information similar to the level and partner level included in the topic of "intimacy of communication" (see FIG. 3).

Then, in the scenario editing step (step S324) of the scenario selection processing for the second and subsequent topics, processing is carried out to acquire, from the transition statement storage, a transition statement corresponding to the moods of the conversation partners in the scenario data of the previous topic, and add the transition statement at the beginning of the utterance content. Note that, depending on the moods of the conversation partners, the transition statement may be unnecessary. In such cases, the adding of the transition statement is foregone.

As a result of the processing described above, the utterance content of "Merry Christmas!" by GladDog in Embodiment 1 is edited to the utterance content, "Cheer up! Merry Christmas!" in the Modified Example 1 of Embodiment 1.

Thus, in the Modified Example 1 of Embodiment 1, the transition from topic to topic can be made to appear more natural. Accordingly, an impression can be created on the users that the robots 100, 100' have advanced communication abilities.

Modified Example 2 of Embodiment 1

In Embodiment 1, the conversation output server 300 provides the functions of the SNS, and the conversation outputter 231 of the conversation output terminal 200 operates as the client software of the SNS. As a result, conversation content that creates the impression that the robot 100 and the other robot 100' are conversing in natural language is output to the display of the conversation output terminal 200. However, the conversation output server 300 need not provide the functions of the SNS. Here, Modified Example 2 of Embodiment 1 is described in which conversation content, which creates the impression that the robot 100 and the other robot 100' are conversing in natural language, is output to the display of the conversation output terminal 200. However, in Modified Example 2 of Embodiment 1, the conversation output server 300 does not provide the functions of the SNS.

In Modified Example 2 of Embodiment 1, the content that the conversation output server 300 sends as the scenario data and the processing executed when the conversation output terminal 200 receives the scenario data in the processing of the thread group for conversation content output (FIG. 8) differs from that of Embodiment 1. Additionally, in Modified Example 2, the conversation output server 300 need not provide the functions of the SNS. In the following description, an example is considered in which a screen is output that creates the impression that the robot 100 (wirelessly connected to the conversation output terminal 200) and the robot 100' (wirelessly connected to the conversation output terminal 200') are conversing.

In the scenario sending step (step S314) of the scenario transmission thread (the flowchart in the center of FIG. 8), the conversation output server 300 according to Modified Example 2 of Embodiment 1 sends the utterance content of the robot 100 and also the response content of the robot 100' as the scenario data to each of the conversation output terminals 200. In the scenario editing step (step S324) of the scenario selection processing (FIG. 9), the conversation output server 300 translates, in advance, the utterance content and the response content into the languages of the countries of residence of the users of the destination conversation output terminals 200.

Additionally, in the scenario receiving step (step S302) of the conversation output thread (the left side or right side flowchart in FIG. 8), the conversation outputter 231 according to Modified Example 2 of Embodiment 1 receives, from the conversation output server 300, the utterance content of the robot 100 and also the response content of the robot 100' as the scenario data. Then, in the conversation content output step (step S303), the utterance content of the robot 100 and the response content of the robot 100' received in step S302 are sequentially output to the displays of the conversation output terminals 200.

As a result of this processing, in Modified Example 2 of Embodiment 1, even though the conversation output server 300 does not provide the SNS, text is displayed on the displays of the conversation output terminals 200, 200' of the users, and this text creates an impression on the users that the robot 100 and the robot 100' are conversing. Accordingly, an impression can be created on the users that the robots 100, 100' have advanced communication abilities. According to Modified Example 2, the conversation content is output to the display of each of the conversation output terminals 200 in natural language used by the user, even in cases in which the SNS provided by the conversation output server 300 does not have a function for translating the data, on the basis of the information of the country of residence of the accessing user, to be returned to the client software.

Modified Example 3 of Embodiment 1

Next Modified Example 3 of Embodiment 1 is described in which the conversation between the robot 100 and the robot 100' leads to a conversation between the user of the robot 100 and the user of the robot 100'.

In Modified Example 3, as illustrated in FIG. 12, topics about the information about the user of the robot 100 (or the robot 100'), such as "introducing the ID of the owner" or "the hobbies of the owner", are prepared as the topics of the scenarios stored in the scenario storage 331. Moreover, the name of the SNS used by the user and the ID of the user on that SNS are stored in the user profile storage 332.

For example, as illustrated in FIG. 12, the utterance content when the topic of the scenario is "introducing the ID of the owner" is stored in the scenario storage 331 as, "[My] owner uses the SNS [name of SNS] under the ID [ID on SNS]"; and the response content is stored in the scenario storage 331 as, "Is that so? [My] owner uses the SNS [name of SNS] under the ID [ID on SNS]." Here, in step S324 of the scenario selection processing (FIG. 9), the portions of [name of SNS] and [ID on SNS] are replaced with the name of the SNS used by each user and the ID on the SNS of each user, which are stored in the user profile storage 332.

For example, as illustrated in FIG. 12, utterance content is stored in the scenario storage 331 for a case in which the topic of the scenario is "the hobbies of the owner" and one hobby of the owner "reading books" in FIG. 12) is introduced. In this case, the utterance content is "One of [my] owner's hobbies is reading hooks". When this hobby is the same as the hobby of the conversation partner ("reading books" in FIG. 12), the response content is "Reading books is [my] owner's hobby too. Let's share our favorite authors and books." Conversely, when this hobby is not the same as the hobby of the owner of the conversation partner, one hobby of the owner of the conversation partner is introduced using the response content, "That's nice. [My] owner's hobby is tennis."

As a result of the configuration described above, in Modified Example 3 of Embodiment 1, not only can an impression be created on the users that the robots 100, 100' have advanced communication abilities but, also, the conversation between the robots 100, 100' can lead to conversation between the users, thereby increasing interaction between the users.

Embodiment 2

In Embodiment 1, an example is described in which the conversation output terminal 200 is a smartphone and the conversation content is output as text. However, the output format of the conversation is not limited to text. Embodiment 2 is described below. In Embodiment 2, the conversation content is output as speech.

Figure 13:
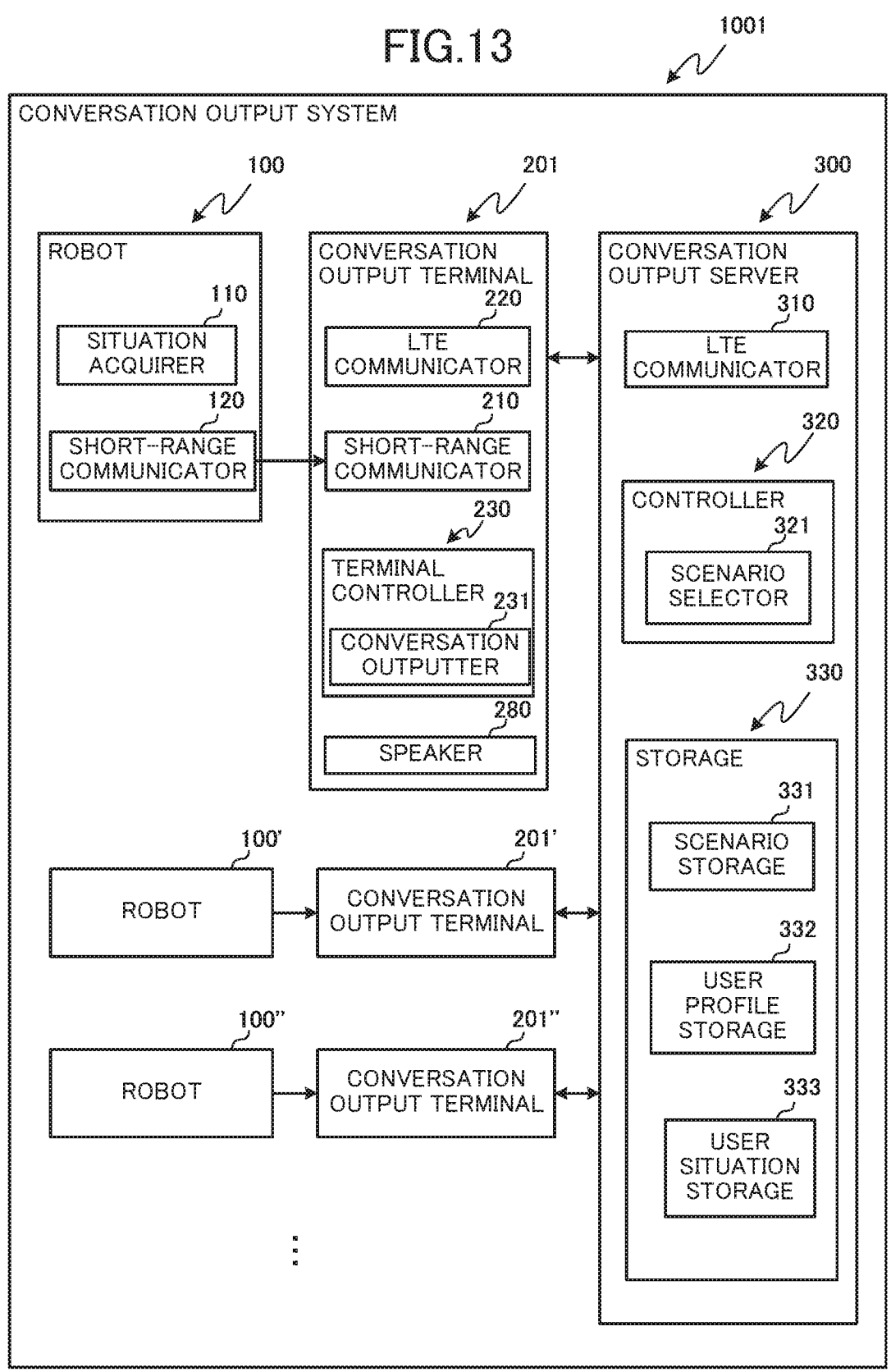
FIG. 13 is a drawing illustrating the functional configuration of a conversation output system according to Embodiment 2 of the present disclosure.

As illustrated in FIG. 13, a conversation output system 1001 according to Embodiment 2 of the present disclosure includes a robot 100, a conversation output terminal 201, and a conversation output server 300. The conversation output terminal 201 is a smart speaker (AI speaker) and outputs conversation content as speech. The conversation output terminal 200 according to Embodiment 1 includes the display 270 as a functional constituent, but the conversation output terminal 201 according to Embodiment 2 includes a speaker 280 as a functional constituent. The conversation outputter 231 synthesizes the conversation content into speech and outputs the speech from the speaker 280. Accordingly, the speaker 280 functions as an outputter.

It is preferable that the voice used when outputting the utterance content of the robot 100 is different from the voice used when outputting the utterance content of the conversation partner, that is, the robot 100'. As such, the conversation output terminal 201 has functions capable of outputting a plurality of types of voices. Moreover, information about the type of voice for each robot is stored in the user profile storage 332 according to Embodiment 2, and the conversation output server 300 sends conversation start notification packets that include the information about the type of voice that corresponds to each of the robots 100. Additionally, the conversation output terminal 201 utters the utterance content corresponding to each of the robots 100 in the type of voice indicated in the conversation start notification packet.

Thus, by using multiple voices on one device, the conversation output terminal 201 can utter in a manner that creates the impression that a plurality of robots 100 are conversing.

As described above, in the present embodiment, the conversation output terminals 200, 200' of each of the users output speech that creates the impression that the robot 100 and the robot 100' are conversing. Accordingly, an impression can be created on the users that the robots 100, 100' have advanced communication abilities.

A configuration is possible in which the conversation output terminal 201 includes the speaker 280 and also the display 270. In such a case, the conversation outputter 231 may output the conversation content as speech from the speaker 280 and also display the conversation content on the display 270. Additionally, the outputter may be configured to be switchable on the basis of commands from the user or the like so that the conversation content is output as speech from the speaker 280 at one time and is displayed on the display 270 at another time.

Modified Example of Embodiment 2

In Embodiment 2, regarding the voices output by the conversation output terminal 201, there are cases in which it is difficult for a user to determine which voice corresponds to the utterance content of the robot 100 of the user, even when the utterance content of each of the robots is output in a different voice. As such, a configuration is possible in which, when performing settings to connect the robot 100 to the conversation output terminal 201, the conversation output terminal 201 utters, "I'm XXX" in the voice of the robot 100 in order to make it easier for the user to ascertain which voice is the voice of the robot 100 of the user. Additionally, a configuration is possible in which, when performing the settings, the conversation output terminal 201 is set such that the robot 100 speaks in a voice preferred by the user (for example, the voice of a man, the voice of a woman, the voice of a child (male or female), the voice of an elderly person (male or female) the voice of an announcer, the voice of a voice actor, or the like).

Here, for the voices of announcers, voice actors, and the like, the voices of famous announcers, voice actors, and the like may be registered in advance in the conversation output terminal 201. Moreover, for the voices of announcers, voice actors, and the like that are not well-known, speech data may be made available for download so that the conversation output terminal 201 can speak in the desired voice.

In addition to uttering when performing the settings to connect the robot 100 to the conversation output terminal 201, the conversation output terminal 201 may be configured to utter "I'm on" or the like in the voice of the robot 100 at any desired timing (for example, at a timing when the user indicates (presses a voice confirmation button (not illustrated in the drawings) of the robot 100 or the conversation output terminal 201) to the robot 100 or the conversation output terminal 201 a desire to confirm the voice).

Furthermore, a configuration is possible in which the conversation output terminal 201 does not utter in the voice of the robot 100 when performing the settings to connect the robot 100 to the conversation output terminal 201, but rather the conversation output terminal 201 utters self-introduction content in voices corresponding to each of the robots at the beginning of the conversation to create the impression on the user that the robot 100 and the robot 100' are actually conversing. For example, in this configuration, the conversation output terminal 201 utters, "I'm robot ○○" in the voice of the robot 100 and, "I'm robot ΔΔ" in the voice of the robot 100' at the beginning of the conversation.

Embodiment 3

In Embodiment 1 and Embodiment 2, the conversation output server 300 is a device that is separate from the conversation output terminals 200, 201, but a configuration is possible in which a specific conversation output terminal is provided with the functions of the conversation output server 300. Next, Embodiment 3, which is an example of such a case, will be described.

Figure 14:
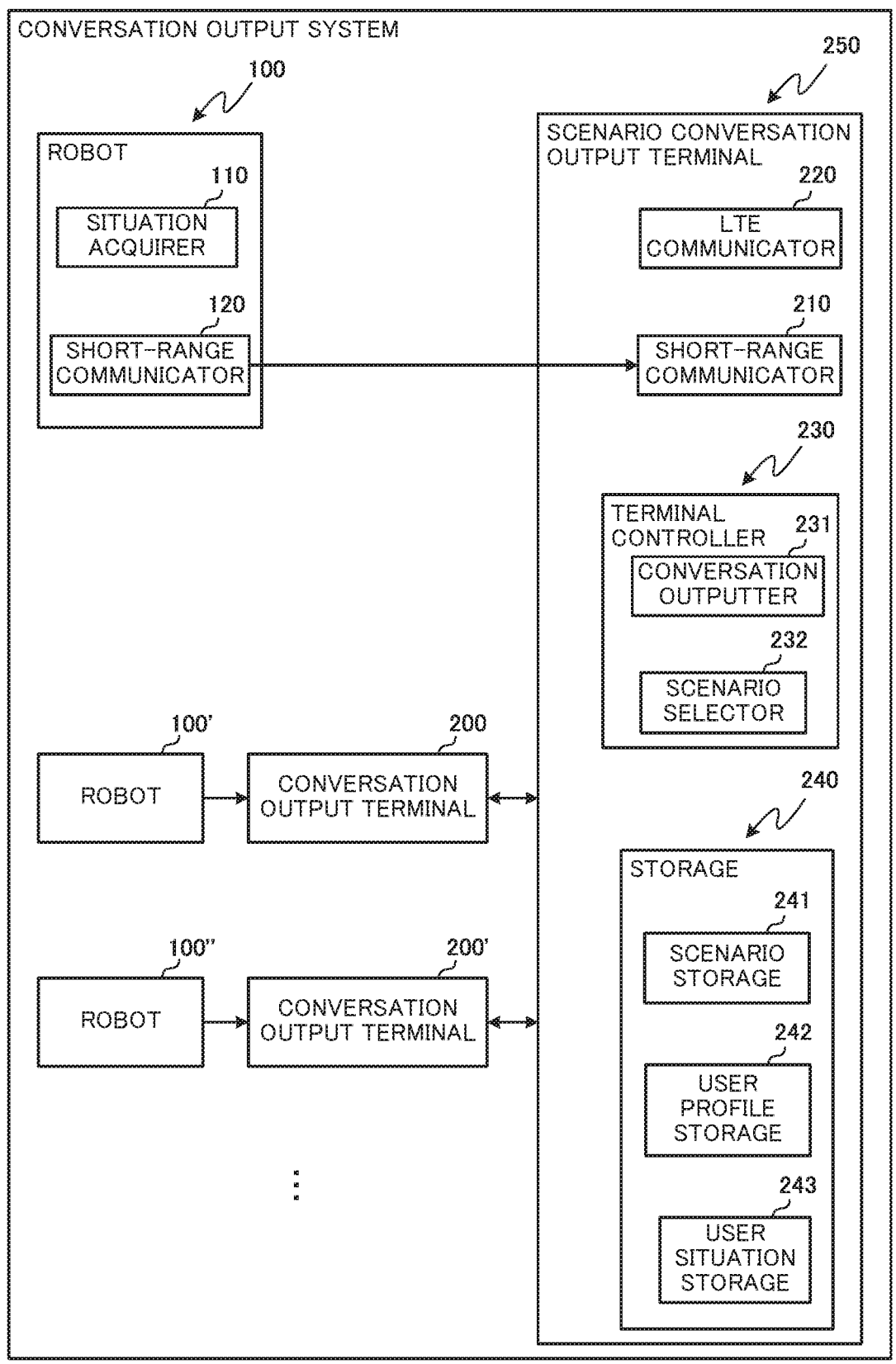
FIG. 14 is a drawing illustrating the functional configuration of a conversation output system according to Embodiment 3 of the present disclosure.

As illustrated in FIG. 14, a conversation output system 1002 according to Embodiment 3 of the present disclosure includes at least a robot 100 and a scenario conversation output terminal 250. As in Embodiment 1, the conversation output system 1002 may include a plurality of pairs of the robot 100 and the conversation output terminal 200. An impression can be created on the users that the robot 100 is conversing with another robot 100 via the scenario conversation output terminal 250 and the conversation output terminal 200.

Embodiment 3 differs from Embodiment 1 in that the scenario conversation output terminal 250 is provided instead of the conversation output server 300. Otherwise, Embodiment 3 has the same configuration as Embodiment 1. As such, the scenario conversation output terminal 250 is described below.

The scenario conversation output terminal 250 is a smartphone that includes a display, the same as the conversation output terminal 200. However, the scenario conversation output terminal 250 also includes the functions of the conversation output server 300. As illustrated in FIG. 14, the scenario conversation output terminal 250 includes a short-range communicator 210, a LTE communicator 220, a terminal controller 230, and a storage 240 as functional constituents. The terminal controller 230 functions as the conversation outputter 231 and a scenario selector 232. The storage 240 includes a scenario storage 241, a user profile storage 242, and a user situation storage 243 as functional constituents.

The short-range communicator 210, the LTE communicator 220, and the conversation outputter 231 are the same as the corresponding constituents of the conversation output terminal 200. However, the LTE communicator 220 of the scenario conversation output terminal 250 communicates with the LTE communicator 220 of the conversation output terminal 200. In one example, the LTE communicator 220 of the scenario conversation output terminal 250 receives the situation information sent by the LTE communicator 220 of the conversation output terminal 200. Additionally, the LTE communicator 220 of the scenario conversation output terminal 250 sends the scenario data to the conversation output terminal 200. Thus, the LTE communicator 220 of the scenario conversation output terminal 250 communicates with the conversation output terminal 200 and, as such, functions as a terminal communicator.

The scenario selector 232 is the same as the scenario selector 321 of the conversation output server 300 according to Embodiment 1. Additionally, the scenario storage 241, the user profile storage 242, and the user situation storage 243 are respectively the same as the scenario storage 331, the user profile storage 332, and the user situation storage 333 of the conversation output server 300 according to Embodiment 1.

With the exception of the following two points, the same processing as described above can be used for the processing whereby the robot 100 converses with the other robot 100 via the scenario conversation output terminal 250 and the conversation output terminal 200. The first point is that the processing of the conversation output server 300 is performed by the scenario conversation output terminal 250. The second point is that, when the robot 100 connected to the scenario conversation output terminal 250 is selected as the conversation partner, the scenario conversation output terminal 250 executes the processing of the conversation output terminal 200 and the processing of the conversation output server 300 as separate, parallel threads. In this case, inter-thread communication is used for the communication between the situation relay thread and the situation update thread that are executed by the scenario conversation output terminal 250 (that is, the LTE communicator 220 is not used). Likewise, inter-thread communication is used for the communication between the request relay thread and the request update thread, and between the conversation output thread and the scenario transmission thread that are executed by the scenario conversation output terminal 250 (that is, the LTE communicator 220 is not used).

As a result of the configuration and the processing content described above, in Embodiment 3, the scenario conversation output terminal 250 can send, to each of the conversation output terminals 200, scenario data based on the situation information received from each of the robots 100, without providing the conversation output server 300. Thus, in the present embodiment, even though the conversation output server 300 is not provided, text is displayed on the displays of the scenario conversation output terminal 250 and the conversation output terminal 200 that creates an impression on the users that the robot 100 and the robot 100' are conversing. Accordingly, an impression can be created on the users that the robots 100, 100' have advanced communication abilities.

Embodiment 4

In the embodiments described above, the communication between the robots is primarily enabled by using the SNS functions. Moreover, when the users see the robots of the users involved in fluent conversational exchanges such as illustrated in FIG. 10 and FIG. 11, the users will admire that the robots can converse so fluently despite lacking or having only limited speech conversation functions. Additionally, the users can enjoy the conversational exchange between the robots. Each robot has a user and, as such, it is expected that the user of the robot 100 will be interested in learning about the user of the conversation partner of the robot 100, namely the robot 100'.

In such a case, to enable interaction between the users, in Modified Example 3 of Embodiment 1, "introducing the ID of the owner", "the hobbies of the owner", and the like for the users of the robot 100 and the robot 100' are prepared as the topics of the scenarios stored in the scenario storage 331, and the names of the SNSes used by the users and the IDs of the users on those SNSes are stored in the user profile storage 332. As a result of this configuration, the user of the robot 100 can communicate with the other user, namely the user of the robot 100'.

However, in Modified Example 3 of Embodiment 1, the topic of the scenario is selected arbitrarily by the conversation output server 300 and, as such, there may be cases in which a conversation based on content that the user wants to know is not performed when the user desires. Additionally, it is expected that some users will prefer not to share personal information with others. As such, next, Embodiment 4, which enables personal information to be disclosed only when the user desires to interact with another user, is described.

Figure 15:
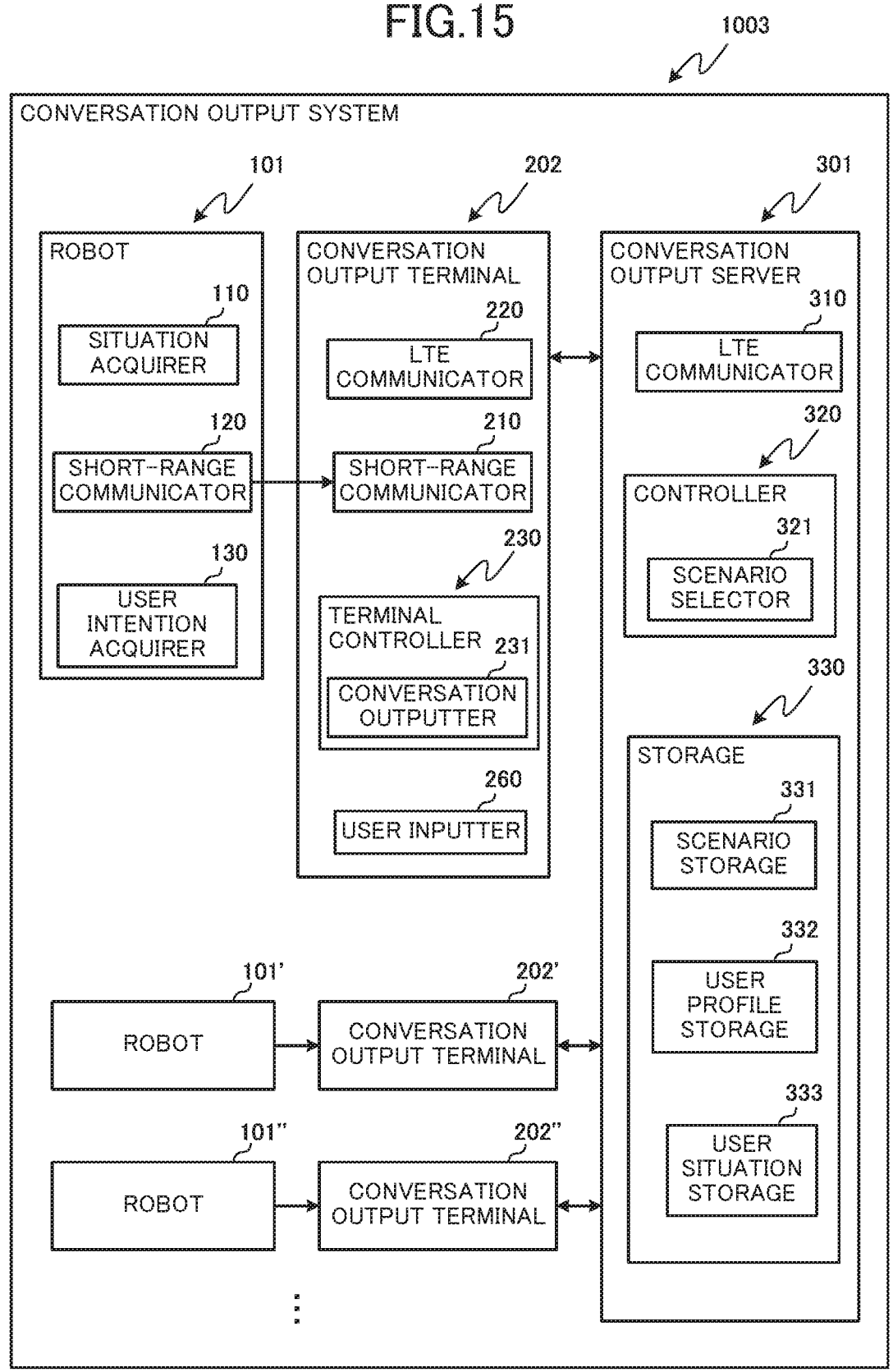
FIG. 15 is a drawing illustrating the functional configuration of a conversation output system according to Embodiment 4 of the present disclosure.

As illustrated in FIG. 15, the conversation output system 1003 according to Embodiment 4 of the present disclosure includes a robot 101, a conversation output terminal 202, and a conversation output server 301. The robot 101 includes a user intention acquirer 130. The user intention acquirer 130 acquires information (user intention information) indicating whether the user desires to disclose personal information of the user (for example, the SNS the user participates in, the ID of the user on that SNS, hobbies, and the like). The user intention acquirer 130 may be implemented, for example, as a simple switch (in this case, the user sets the switch to ON when desiring to disclose personal information, and turns the switch to OFF when not desiring to disclose personal information). Additionally, the robot 101 may be configured to acquire the user intention information by speech recognition. In this case, the user intention acquirer 130 includes a microphone 133 and a speech recognizer (not illustrated in the drawings).

The robot 101 sends the user intention information acquired by the user intention acquirer 130 to the conversation output terminal 202 via the short-range communicator 120. The conversation output terminal 202 sends the user intention information received from the robot 101 to the conversation output server 301. The conversation output server 301 selects a scenario on the basis of the received user intention information.

In one example, the robot 101 and the robot 101' are selected as conversation partners. When the user intention information sent from the robot 101 and the user intention information sent from the robot 101' both indicate "do not disclose personal information", when selecting the scenario, the scenario is not selected from topics that disclose personal information such as "introducing the ID of the owner", "the hobbies of the owner", and the like. Conversely, when the user intention information sent from the both of the robots 101, 101' indicates "disclose personal information", when selecting the scenario, the scenario is frequently selected from topics that disclose personal information such as "introducing the ID of the owner", "the hobbies of the owner", and the like.

Additionally, when only the user intention information from one of the robots 101 that are conversing indicates "do not disclose personal information", the conversation output server 301 sends, to the conversation output terminal 202, utterance content such as "[My] owner wants to exchange personal information. It is okay?" As a result, the user that set the user intention information to "do not disclose personal information" is provided with an opportunity to allow the disclosure of personal information. Note that a configuration is possible in which an opportunity to allow the disclosure of personal information is not provided by the conversation output server 301 to the user that indicated "do not disclose personal information" (the user intention information acquired by the user intention acquirer 130 of the robot 101 indicates, "do not disclose personal information"). In this case, the conversation output server 301 selects a scenario that discloses only the personal information of the user that has indicated, "allow the disclosure of personal information" (the user intention information acquired by the user intention acquirer 130 of the robot 101 indicates "disclose personal information").

The conversation output terminal 202 includes a user inputter 260. The user inputter 260 receives utterance content (text) input by the user, and the conversation output terminal 202 posts that utterance content on the SNS provided by the conversation output server 301. As a result, the user of the robot 101 can access the SNS on which the robot 101 and the other robot 101' are conversing and converse with the user of the other robot 101'.

Conversation examples (scenario examples) such as the example given below are anticipated:

GladDog: I'm happy because [my] owner plays with [me] a lot!

HappyCat: That's nice. [My] owner plays with [me] a lot too!

GladDog: [My] owner's hobby is tennis.

HappyCat: Really? [My] owner's hobby is tennis too. It would be fun to play tennis together someday.

The scenarios illustrated in FIG. 12 include scenarios that assume combinations of hobbies. However, the scenarios are not limited thereto. For example, a configuration is possible in which a determination step for determining whether the hobbies of the conversation partners match is added to the scenario selection processing (FIG. 9) and, when the hobbies match, a scenario is generated in which the conversation partners discuss the matching. In the aforementioned conversation, the hobbies are both tennis and match and, as such, a scenario such as that given below may be generated.

GladDog: We have the same hobby!

HappyCat: We sure do. We have the same hobby.

In a case in which the user of the robot 101 that views this conversation desires to interact with the user of the conversation partner, namely the robot 101', the user of the robot 101 informs the user intention information acquirer of the robot 101 of the desire to disclose personal information (far example, the user turns the switch ON, thereby indicating that personal information may be disclosed). Then, this user intention information is sent to the conversation output server 301 via the conversation output terminal 202. In cases in which the user of the robot 101', which is the conversation partner of the robot 101, also desires to disclose personal information, the user intention acquirer 130 of the robot 101' acquires the user intention information indicating the desire to disclose personal information, and sends this user intention information to the conversation output server 301.

Thus, since the user intention information sent from the both of the robots 101, 101' indicates "disclose personal information", when selecting the scenario, the conversation output server 301 frequently selects scenarios from topics that disclose personal information such as "introducing the ID of the owner", "the hobbies of the owner", and the like.

For example, when the topic of "address of owner" is selected, a conversation such as follows is carried out.

GladDog: Where does [your] owner live? [My] owner lives in Tokyo.

HappyCat: [My] owner lives in Seattle.

In another example, when the topic of "email address of owner" is selected, a conversation such as follows is carried out.

GladDog: What is [your] owner's email address? [My] owner's email address is name@ne.jp.

HappyCat: [My] owner's email address is name@net.

Here, the information of the users is exchanged in the conversation between the robots. However, a configuration is possible in which if, as a result of viewing this conversational exchange between the robots 101, the user of the robot 101 is interested in the user of the conversation partner, namely the robot 101', the user of the robot 101 can converse with the user of the robot 101' on the SNS using the conversation output terminal 202.

A conversation such as that given below is considered:

GladDog: I'm happy because [my] owner plays with [me] a lot!

HappyCat: That's nice. [My] owner plays with [me] a lot too!

GladDog: [My] owner's hobby is tennis.

HappyCat: Really? [My] owner's hobby is tennis too. It would be fun to play tennis together someday.

After the robots 101 have such a conversation, the users can converse directly as follows:

Tarou: Hello. I'm Tarou. I'm GladDog's owner. Is it okay to contact you directly?

Lily: Hello. That's fine with me.

Tarou: Thank you! I see that you play tennis. I also play tennis.

Lily: What a coincidence!

Thus, conversations between the robots 101 can lead to communication between the users.

As a modified example of Embodiment 4, a configuration is possible in which the user intention acquirer 130 is provided in the conversation output terminal 202 instead of in the robot 101. In this case, the user can input whether to disclose personal information by operating a touch panel or the like of the conversation output terminal 202, and the user intention acquirer 130 can acquire the user intention information from that touch panel or the like.

Embodiment 5

In Embodiment 1, the robot 100 does not include a LTE communicator and, as such, the situation information acquired by the situation acquirer 110 is sent to the conversation output terminal 200 via the short-range communicator 120, and the conversation output terminal 200 sends the situation information to the conversation output server 300 via the LTE communicator 220. However, if the robot includes a LTE communicator, the situation information can be sent directly to the conversation output server 300. Moreover, in Embodiment 1, the situation acquirer 110 of the robot 100 acquires the situation information. However, by enabling the situation information to be acquired by a sensor that is independent of the robot, situation information from a sensor that is not provided to the robot can be used. Next, Embodiment 5, which is an example of such a case, will be described.

Figure 16:
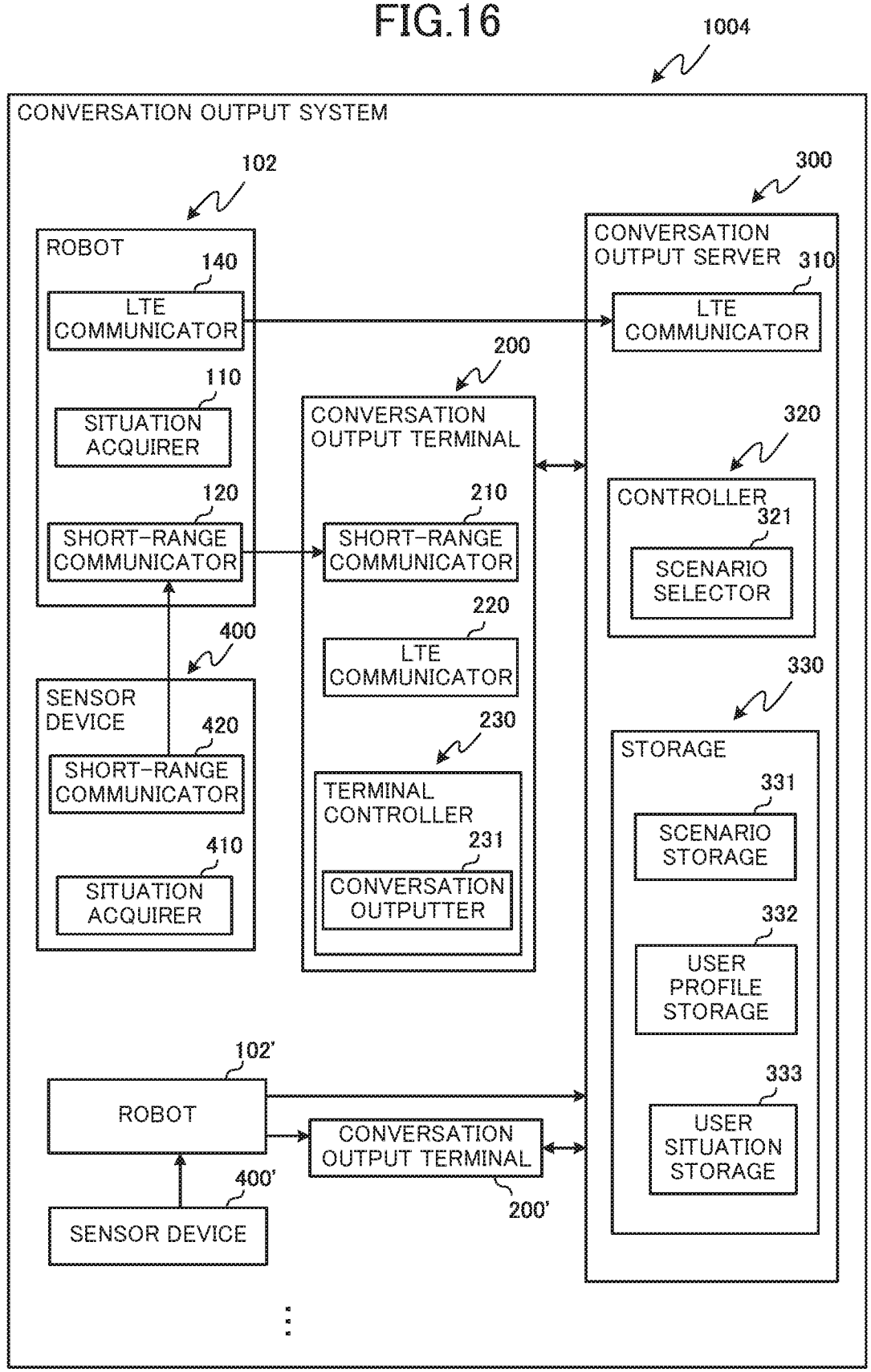
FIG. 16 is a drawing illustrating the functional configuration of a conversation output system according to Embodiment 5 of the present disclosure.

As illustrated in FIG. 16, a conversation output system 1004 according to Embodiment 5 of the present disclosure includes a robot 102, a conversation output terminal 200, a conversation output server 300, and a sensor device 400. The sensor device 400 typically is mounted on the robot 102 and supplements the functions of the situation acquirer 110 of the robot 102. However, provided that the sensor device 400 is capable of acquiring information about the situation around the robot 102, the sensor device 400 need not be mounted on the robot 102. The robot 102, the conversation output terminal 200, and the sensor device 400 form a triplet that is connected wirelessly by short-range wireless communication. The conversation output system 1004 may include a plurality of triplets of the robot 102, the conversation output terminal 200, and the sensor device 400 (for example, the robot 102, the conversation output terminal 200, and the sensor device 400; a robot 102', a conversation output terminal 200', and a sensor device 400'; and the like).

The sensor device 400 includes a situation acquirer 410 and a short-range communicator 420, and sends the situation information acquired by the situation acquirer 410 to the robot 102.

The situation acquirer 410 acquires information about the situation around the robot 102, that is, the situation information, from various sensors (a temperature sensor, a humidity sensor, an illuminance sensor, a human sensor, and the like) of the sensor device 400.

The short-range communicator 420 includes a short-range wireless communication device (for example, a Bluetooth (registered trademark) communication device), and sends the situation information acquired by the situation acquirer 410 to the robot 102. While not illustrated in FIG. 16, a configuration is possible in which the short-range communicator 420 communicates with the short-range communicator 210 of the conversation output terminal 200 and sends the situation information acquired by the situation acquirer 410 to the conversation output terminal 200.

While not illustrated in the drawings, a configuration is possible in which the sensor device 400 includes a LTE communicator, and the sensor device 400 directly sends the situation information acquired by the situation acquirer 410 to the conversation output server 300.

Moreover, a configuration is possible in which a plurality of sensor devices 400 are provided. For example, a sensor device 400A including only a temperature sensor, a sensor device 400B including only a humidity sensor, and a sensor device 400C including only an illuminance sensor may be provided, and each of the sensor devices 400A, 4009, and 400C may send the situation information acquired by the sensor of each device to the robot 102.

In addition to the configuration of the robot 100 according to Embodiment 1, the robot 102 so includes a LTE communicator 140. The LTE communicator 140 includes a device that communicates on the LTE communication standard, and communicates with the conversation output server 300. In one example, the LTE communicator 140 sends the situation information to the conversation output server 300.

The short-range communicator 120 of the robot 102 communicates with the short-range communicator 210 of the conversation output terminal 200 and, also, with the short-range communicator 420 of the sensor device 400, and receives, from the sensor device 400, the situation information acquired by the sensor device 400.

A configuration is possible in which the robot 102 does not include the situation acquirer 110. In this case, all of the information about the situation around the robot 102, that is, all of the situation information, is acquired by the sensor devices 400.

The configurations of the conversation output terminal 200 and the conversation output server 300 are the same as in Embodiment 1 and, as such, descriptions thereof are foregone. Moreover, many portions of the processing of the various threads executed by the robot 102, the conversation output terminal 200 and the conversation output server 300 are the same as in Embodiment 1. As such, the following description focuses on the different portions.

In step S101 of the situation transmission thread (left side of FIG. 6), the robot 102 according to Embodiment 5 acquires, via the short-range communicator 120, the situation information acquired by the situation acquirer 110 and, also, the situation information acquired by the situation acquirer 410 of the sensor device 400.

In step S102 of the situation transmission thread (left side of FIG. 6), the robot 102 according to Embodiment 5 may send, via the LTE communicator 140, the situation information acquired in step S101 to the conversation output server 300. When performing such processing, the conversation output terminal 200 need not execute the situation relay thread (center in FIG. 6). Rather, in step S121 of the situation update thread (right side of FIG. 6) the conversation output server 300 waits until the situation information is sent from the robot 102 and, when the situation information is sent, the conversation output server 300 receives the situation information via the LTE communicator 310.

In cases in which the sensor device 400 is mounted on the robot 102, in step S201 and step S203 of the request transmission thread (left side of FIG. 7), the robot 102 according to Embodiment 5 may use the situation information acquired from the sensor device 400 to perform the determination of whether the user has approached and the determination of whether the user is still near.

Other than the exceptions described above, the processing is the same as in Embodiment 1 and, as such, description thereof is foregone. In Embodiment 5, the robot 102 sends the situation information directly to the conversation output server 300 and, as such, the load on the conversation output terminal can be reduced.

Additionally, in Embodiment 5, the situation information acquired by the sensor device 400 can also be used. As such, the range of the situation information that can be used in the scenarios can be widened, and greater variation can be provided in the scenarios. For example, it is expected that only the minimal number of sensors will be mounted on the robot 102 in order to suppress costs but, even in this case, the user can purchase additional sensor devices 400 later and enjoy conversations with more variation.

In Embodiment 5, the robot 102 need not include the LTE communicator 140 when it is not necessary for the robot 102 to send the situation information directly to the conversation output server 300 (when the situation information is sent via the conversation output terminal 200). Additionally, in Embodiment 5, the conversation output system 1004 need not include the sensor device 400 when it is not necessary to increase the variation of the situation information.

Embodiment 6

In the embodiments described above, the conversation output server 300 selects the scenario data on the basis of the situation information and outputs that scenario data to the conversation output terminal 200, thereby creating an impression on the user that the robot 100 has advanced communication abilities. However, an impression can be created, independent of the scenario data, on the user that the robot 100 has advanced communication abilities. Next, Embodiment 6, which is an example of such a case, will be described.

Figure 17:
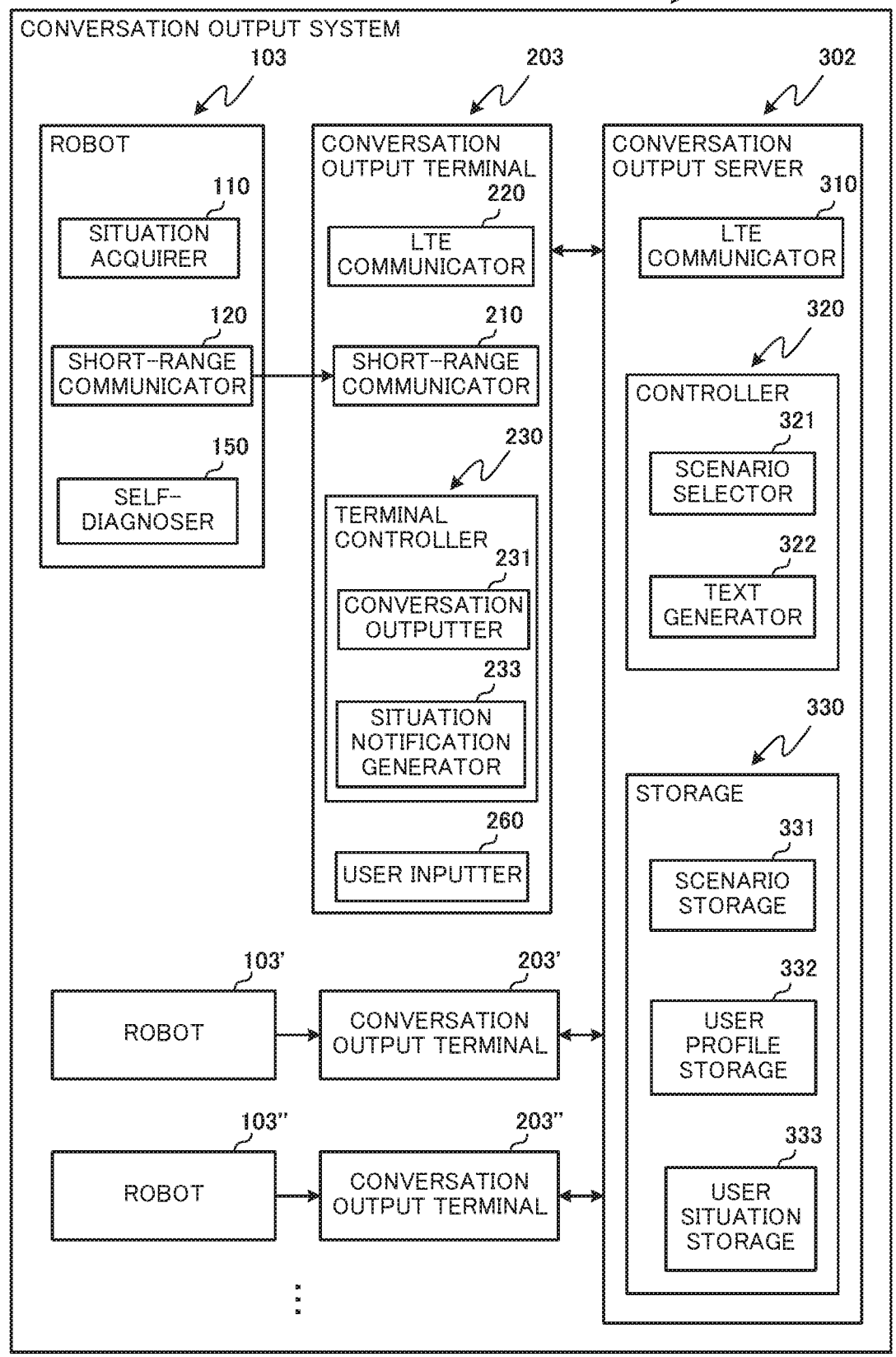
FIG. 17 is a drawing illustrating the functional configuration of a conversation output system according to Embodiment 6 of the present disclosure.

As illustrated in FIG. 17, a conversation output system 1005 according to Embodiment 6 of the present disclosure includes a robot 103, a conversation output terminal 203, and a conversation output server 302.

In addition to the configuration of the robot 100 according to Embodiment 1, the robot 103 also includes a self-diagnoser 150. The self-diagnoser 150 performs a diagnosis of the robot 103 and, if an abnormality is found, sends information about the abnormality, as situation information, to the conversation output terminal 203 via the short-range communicator 120. For example, in cases in which the legs 135 or the tail 136 cannot be moved or the movement of the legs 135 or the tail 136 worsens, information indicating the same is sent to the conversation output terminal 203 as situation information.

In addition to the configuration of the conversation output terminal 202 according to Embodiment 4, the terminal controller 230 of the conversation output terminal 203 includes a situation notification generator 233. The conversation output terminal 203 stores contact information of a service center that is contracted for repairs and the like of the robot 103, and can issue a message to the service center via the LTE communicator 220.

In the conversation output terminal 203, when the short-range communicator 210 receives, from the robot 103, situation information about an abnormality of the robot 103, the situation notification generator 233 generates a message in natural language for notifying about the situation information. For example, if situation information is received that notifies that the legs 135 cannot be moved, the situation notification generator 233 generates a message such as, "I am robot model ABC. My serial number is XXX. This morning, my legs stopped moving. What should I do?"

Then, the conversation output terminal 203 sends, via the LTE communicator 220, the message generated by the situation notification generator 233 to the service center, and outputs the exchange with the service center about the message using the conversation outputter 231.

By outputting the exchange with the service center about the message, the conversation output system 1005 can create an impression on the user that the robot 103 is conversing with a representative (person) of the service center. Thus, without using the user inputter 260, the conversation output terminal 203 can create an impression on the user that the robot 103 is conversing with a representative of the service center. As such, as long as this function is provided, the conversation output terminal 203 need not include the user inputter 260.

In addition to the configuration of the conversation output server 300 according to Embodiment 1, the conversation output server 302 includes a text generator 322. Note that, in cases in which the processing of the scenario transmission thread (FIG. 8) is not performed by the conversation output server 302, the conversation output server 302 need not include the scenario selector 321 and the scenario storage 331.

When a statement (text input by the user or the like) is given, the text generator 322 generates a response that creates the impression of responding to that statement. Any method may be used to generate the response, and an example of such a method is given below.

A large amount of conversational exchanges on SNSes disclosed on the Internet or the like are acquired, in advance, via the LTE communicator 310 and saved in the storage 330. When a statement is given, text that is most similar to the statement is searched for among the conversational exchanges stored in the storage 330. Then, text, which is used as a response to the text that is the most similar to the statement, is set as the response. In the processing to search for the text that is the most similar to the statement, it is not necessary to search for the text that is strictly the most similar. For example, processing may be performed in which text is searched for that includes a key word found in the statement, and text used as the response to that text is used as the response.

Then, the conversation output server 302 sends, via the LTE communicator 310, the text generated by the text generator 322 to the conversation output terminal 203, and the conversation output terminal 203 outputs that text using the conversation outputter 231. As a result, the user can enjoy a simulated chat with the robot 103. A thread group for this simulated chat is described while referencing FIG. 18.

Figure 18:
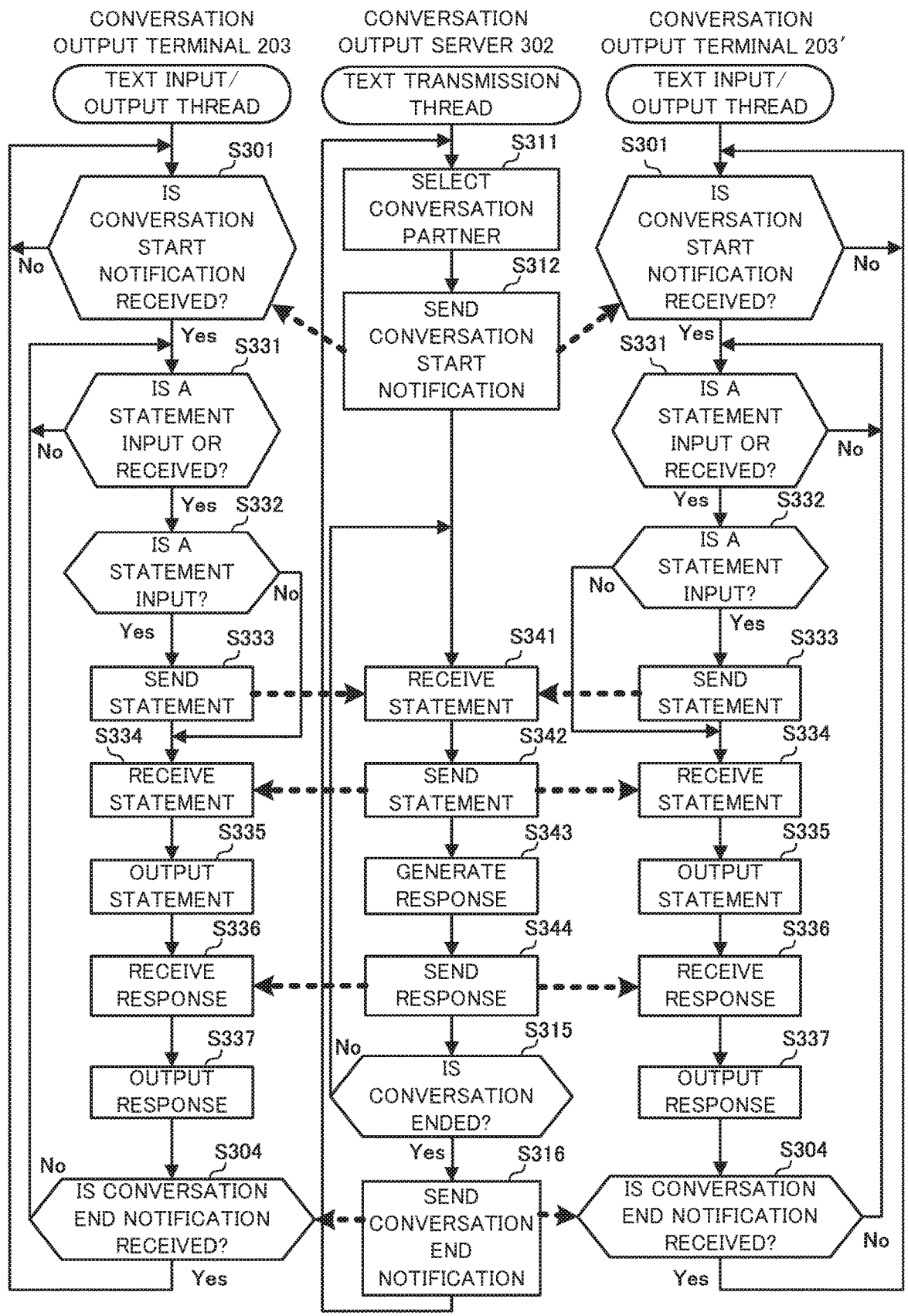
FIG. 18 is a flowchart of a thread group for a simulated chat according to Embodiment 6.

When the power supply of the conversation output terminal 203 is turned ON, the text input/output thread illustrated by the flowchart on the left side of FIG. 18 is started. Additionally, when the power supply of the conversation output server 302 is turned ON, the text transmission thread illustrated by the flowchart in the center of FIG. 18 is started. Note that the text input/output thread illustrated by the flowchart on the right side of FIG. 18 is the same as the flowchart on the left side of FIG. 18. It is assumed that the flowchart on the right side is executed by the conversation output terminal 203' that is wirelessly connected to the other robot 103', which is the conversation partner of the robot 103 that is wirelessly connected to the conversation output terminal 203. The dashed arrows in FIG. 18 indicate that data is sent and received from thread to thread.

In cases in which the conversation output server 302 includes the scenario selector 321 and the scenario storage 331, the text input/output thread and the text transmission thread are executed in parallel with the conversation content output thread described while referencing FIG. 8. In such cases as well, the conversation start notification determination step (step S301) and the conversation end notification determination step (step S304) are the same in the processing of the text input/output thread (FIG. 18) and the conversation output thread (FIG. 8). The conversation partner selection step (step S311), the conversation start notification sending step (step S312), the conversation end determination step (step S315), and the conversation end notification sending step (step S316) are the same in the processing of the text input/output thread (FIG. 18) and the conversation output thread (FIG. 8).

Accordingly, in cases in which the conversation output server 302 includes the scenario selector 321 and the scenario storage 331, step S331 to step S337 of the text input/output thread are executed in parallel with the scenario receiving step (step S302) and the conversation content output step (step S303), and step S341 to step S344 of the text transmission thread are executed in parallel with the scenario selection processing (step S313) and the scenario transmission step (step S314). Regardless of whether the conversation output server 302 includes the scenario selector 321 and the scenario storage 331, the processing of the steps in FIG. 18 that are marked with the same reference numerals as in FIG. 8 is the same as the processing of the steps in FIG. 8. As such, only the portions that differ from the processing described for FIG. 8 will be described below.

First, in the input/output thread, if a conversation start notification packet is received (step S301; Yes), the terminal controller 230 determines whether a statement is input from the user inputter 260 or a statement is received from the LTE communicator 220 (step S331). If there is no input or receiving of a statement (step S331; No), step S331 is executed.

If a statement is input from the user inputter 260 or a statement is received from the LTE communicator 220 (step S331; Yes), the terminal controller 230 determines whether the statement is input from the user inputter 260 (step S332). If the statement is not input from the user inputter 260 (step S332; No), step S334 is executed.

If the statement is input from the user inputter 260 (step S332; Yes), the terminal controller 230 sends the statement input from the user inputter 260 to the conversation output server 302 via the LTE communicator 220 (step S333). Then, in the text transmission thread of the conversation output server 302, the controller 320 receives, via the LTE communicator 310, the statement sent from the conversation output terminal 203 (step S341), and sends the received statement to all of the conversation output terminals 203 that are conversation partners, including the original sender of the statement.

Then, in the text transmission thread, the text generator 322 generates a response to the statement (step S343), and sends the generated response to all of the conversation output terminals 203 that are conversation partners (step S344).

Then, in the text input/output thread, the terminal controller 230 receives, via the LTE communicator 220, the statement sent from the conversation output server 302 (step S334), and the conversation outputter 231 outputs the received statement (step S335).

Then, the terminal controller 230 receives, via the LTE communicator 220, a response sent from the conversation output server 302 (step S336), and the conversation outputter 231 outputs the received response (step S337). The other processing is the same as that described for the steps (indicated by the same reference numerals) described while referencing FIG. 8. As such, description thereof is foregone.

Thus, as a result of the processing illustrated in FIG. 18, the conversation output terminal 203 can output a response to a statement input by a user or the like, wherein the response is based on a conversation actually had on an SNS. As such, the conversation output system 1005 can create an impression on the user that the robot 103 is conversing in natural language.

Note that, in the embodiments described above, the LTE communicators 140, 220, and 310 are described as devices that communicate on the LTE communication standard. However, the LTE communicators 140, 220, and 310 are not limited to devices that communicate on the LTE communication standard. Provided that communication between the LTE communicators 140, 220, and 310 is possible, any device can be used.

In the embodiments described above, the data communication is described as being carried out wirelessly, but part or all of the data communication may be carried out over wires instead of wirelessly. Particularly, in Embodiment 3, as described above, inter-thread communication is used for the communication between the situation relay thread and the situation update thread, between the request relay thread and the request update thread, and between the conversation output thread and the scenario transmission thread that are executed by the scenario conversation output terminal 250, and the LTE communicator 220 is not used.

Advantageous Effects of the Embodiments

The user of the robot sees text displayed on the conversation output terminal or hears fluent conversational exchange uttered as speech by the conversation output terminal. As a result, an impression can be created on the user that the robot has advanced conversation abilities, even though the robot lacks or has limited speech conversation functions. Moreover, the user can observe and enjoy conversational exchanges between the robots. Furthermore, the conversations between the robots can lead to communication between the user and other users. Additionally, without interaction of the users, conversations are output that create an impression that the robots have become friends. As a result, the user can be inspired by the conversations between the robots to expand the circle of communication of the user.

Note that, the us functions of the conversation output terminals 200, 201 and 202, the scenario conversation output terminal 250, and the conversation output servers 300 and 301 can be implemented by a computer such as a typical personal computer (PC). Specifically, in the embodiments described above, examples are described in which the programs executed by the conversation output terminals 200, 201 and 202, the terminal controller 230 of the scenario conversation output terminal 250, and the conversation output servers 300 and 301 are stored in advance in the ROM of the storages 240 and 330. However, a computer may be configured that is capable of realizing these various features by storing and distributing the programs on a non-transitory computer-readable recording medium such as a compact disc read-only memory (CD-ROM), a digital versatile disc (DVD), and a magneto-optical disc (MO), reading out and installing these programs on the computer. Moreover, in the embodiments described above, examples are described of one-on-one conversations between the robots 100 and 100', but a configuration is possible in which a plurality of robots converse, such as in the group feature of LINE (registered trademark). In this case, the scenario data is complex and the capacity is large, but on a fundamental level, the same pattern is simply replicated.

Additionally, examples are described in which the scenario data is prepared in advance, but the scenario data can be sequentially updated or newly generated by a learning function or AI. Furthermore, in the embodiments described above, the information about the robot 100 and the information about the robot 100' are both managed on the same conversation output server. As such, the conversation output server can generate both the utterances of the robot 100 and the utterances of the robot 100', and can generate conversation text that corresponds to the scenario.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A conversation output system for outputting conversation among robots, the conversation output system comprising:
   terminals connected to the respective robots; and
   a server connected to the terminals,
   wherein
   the terminals each comprise a first communicator, a second communicator, a display, and a first processor,
   the first processor
      controls the first communicator to receive from the corresponding robot first information that is information about a situation around the robot, and
      controls the second communicator to send the received first information to the server,
   the server comprises a third communicator and a second processor,
   the second processor
      controls the third communicator to receive the first information respectively sent from the terminals,
      generates, based on the received first information, conversation data indicating content that the robots communicating with the respective terminals converse with each other, the content corresponding to the first information, and
      controls the third communicator to send information that is based on the generated conversation data to the terminals,
   the first processor further
      controls the second communicator to receive the conversation data sent from the server, and
      causes the display to output the received conversation data, thereby creating an impression on a user of the terminal that the robots are having a conversation that corresponds to at least the first information,
   the server is configured to be capable of providing a social networking service (SNS), and
   the first processor
      functions as SNS client software that accesses the SNS provided by the server,
      sends to the server, via the second communicator, the received acquired conversation data as content to be written to the SNS, and
      controls the display such that information that is based on the conversation data is output.

2. A conversation output system for outputting conversation among robots, the conversation output system comprising:
   terminals connected to the respective robots; and
   a server connected to the terminals,
   wherein
   the terminals each comprise a first communicator, a second communicator, a display, and a first processor,
   the first processor
      controls the first communicator to receive from the corresponding robot first information that is information about a situation around the robot, and
      controls the second communicator to send the received first information to the server
   the server comprises a third communicator and a second processor,
   the second processor
      controls the third communicator to receive the first information respectively sent from the terminals,
      generates, based on the received first information, conversation data indicating content that the robots communicating with the respective terminals converse with each other, the content corresponding to the first information, and
      controls the third communicator to send information that is based on the generated conversation data to the terminals,
   the first processor further
      controls the second communicator to receive the conversation data sent from the server, and
      causes the display to output the received conversation data, thereby creating an impression on a user of the terminal that the robots are having a conversation that corresponds to at least the first information, and
the second processor
selects a first topic of conversation,
generates first conversation data based on the selected first topic and the first information,
controls the display such that information that is based on the generated first conversation data is output and, thereafter, selects a second topic that is different from the selected first topic, and
generates second conversation data based on the selected second topic and the first information.

3. The conversation output system according to claim 2, wherein
the second processor
acquires a transition statement being text that connects the first conversation data and the second conversation data, and
adds the acquired transition statement before the generated second conversation data.

4. The conversation output system according to claim 1, wherein
the second processor
acquires a country of residence of the user, and
translates the conversation data into a language of the acquired country of residence.

5. A conversation output system for outputting conversation among robots, the conversation output system comprising:
terminals connected to the respective robots; and
a server connected to the terminals,
wherein
the terminals each comprise a first communicator, a second communicator, a display, and a first processor,
the first processor
controls the first communicator to receive from the corresponding robot first information that is information about a situation around the robot, and
controls the second communicator to send the received first information to the server
the server comprises a third communicator and a second processor,
the second processor
controls the third communicator to receive the first information respectively sent from the terminals,
generates, based on the received first information, conversation data indicating content that the robots communicating with the respective terminals converse with each other, the content corresponding to the first information, and
controls the third communicator to send information that is based on the generated conversation data to the terminals,
the first processor further
controls the second communicator to receive the conversation data sent from the server, and
causes the display to output the received conversation data, thereby creating an impression on a user of the terminal that the robots are having a conversation that corresponds to at least the first information, and
the second processor
acquires, from the user, user intention information that indicates whether the user desires to disclose personal information, and
generates the conversation data based on the first information that includes the information about the user when the acquired user intention information indicates that the user desires to disclose the personal information.

6. The conversation output system according to claim 1, wherein
the terminal further includes a speaker, and
the first processor synthesizes, into speech, the generated conversation data, and outputs the speech from the speaker, instead of causing the display to output the conversation data.

7. A conversation output method executed by a first processor and a second processor of a conversation output system for outputting conversation among robots, the conversation output system including terminals each including a display and the first processor and connected to the respective robots, and a server including the second processor, configured to be capable of providing a social networking service (SNS), and connected to the terminals, the method comprising:
receiving by the first processor first information that is information about a situation around the corresponding robot,
sending by the first processor the received first information to the server,
receiving by the second processor the first information respectively send from the terminals,
generating by the second processor, based on the received first information, conversation data indicating content that the robots communicating with the respective terminals converse with each other, the content corresponding to the first information, and
sending by the second processor information that is based on the generated conversation data to the terminals,
wherein the first processor
functions as SNS client software that accesses the SNS provided by the server,
receives the conversation data sent from the server
sends to the server, via the second communicator, the received conversation data as content to be written to the SNS, and
controls the display such that information that is based on the conversation data is output, and
causes the display to output the received conversation data, thereby creating an impression on a user of the terminal that the robots are having a conversation that corresponds to at least the first information.

* * * * *